US012713027B2

(12) United States Patent
Choi et al.

(10) Patent No.: US 12,713,027 B2
(45) Date of Patent: Aug. 18, 2026

(54) LEARNING METHOD OF NEURAL CODEC, ENCODING AND DECODING METHOD OF NEURAL CODEC

(71) Applicant: SAMSUNG ELECTRONICS CO., LTD., Suwon-si (KR)

(72) Inventors: Woosuk Choi, Suwon-si (KR); Seok Kang, Suwon-si (KR); Seungeon Kim, Suwon-si (KR); Jeongwon Kim, Suwon-si (KR); Jun Hyuk Kim, Suwon-si (KR); Wonseop Song, Suwon-si (KR); Wonhee Lee, Suwon-si (KR); Young Hun Sung, Suwon-si (KR); Dokwan Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/092,528

(22) Filed: Mar. 27, 2025

(65) Prior Publication Data

US 2026/0052251 A1 Feb. 19, 2026

(30) Foreign Application Priority Data

Aug. 14, 2024 (KR) ........................ 10-2024-0108836

(51) Int. Cl.
*H04N 19/13* (2014.01)
*H04N 19/184* (2014.01)
*H04N 19/196* (2014.01)

(52) U.S. Cl.
CPC ........... *H04N 19/13* (2014.11); *H04N 19/184* (2014.11); *H04N 19/196* (2014.11)

(58) Field of Classification Search
CPC ..... H04N 19/13; H04N 19/184; H04N 19/196
See application file for complete search history.

(56) References Cited

U.S. PATENT DOCUMENTS

| | | | |
|---|---|---|---|
| 7,788,106 B2 | 8/2010 | Sperschneider et al. | |
| 11,405,050 B2 | 8/2022 | Marpe et al. | |
| 2021/0028794 A1 | 1/2021 | Marpe et al. | |
| 2021/0174815 A1* | 6/2021 | Beack | G10L 19/028 |
| 2022/0084255 A1* | 3/2022 | Minnen | G06N 3/088 |
| 2023/0206512 A1* | 6/2023 | Minnen | G06N 3/088 382/232 |

(Continued)

FOREIGN PATENT DOCUMENTS

| | | |
|---|---|---|
| CN | 114501011 A | 5/2022 |
| KR | 10-2022-0107081 A | 8/2022 |

(Continued)

OTHER PUBLICATIONS

Minnen et al., Channel-wise Autoregressive Entropy Models for Learned Image Compression, 2020, IEEE International Conference on Image Processing (ICIP) 2020 (Year: 2020).*

(Continued)

*Primary Examiner* — Francis Geroleo
(74) *Attorney, Agent, or Firm* — Sughrue Mion, PLLC

(57) ABSTRACT

An encoding method of a neural codec performed by at least one processor includes encoding input data to a first latent vector of a quantized representation; generating, after encoding the input data, a bitstream corresponding to the input data by channel-wise grouping and entropy encoding the first latent vector; and transmitting the bitstream.

17 Claims, 19 Drawing Sheets

(56) References Cited

U.S. PATENT DOCUMENTS

| | | | | |
|---|---|---|---|---|
| 2025/0045970 | A1* | 2/2025 | Kwong | G06T 9/001 |
| 2025/0088648 | A1* | 3/2025 | Presta | G06N 3/0455 |
| 2025/0343935 | A1* | 11/2025 | Wu | H04N 19/196 |
| 2026/0012642 | A1* | 1/2026 | Ma | H04N 19/63 |

FOREIGN PATENT DOCUMENTS

| | | | | | |
|---|---|---|---|---|---|
| KR | 10-2558015 | B1 | | 7/2023 | |
| KR | 20250068805 | A | * | 5/2025 | G06N 3/04 |
| WO | 2023/239685 | A1 | | 12/2023 | |
| WO | WO-2024249752 | A1 | * | 12/2024 | H04N 19/132 |

OTHER PUBLICATIONS

Minnen et al., "Joint Autoregressive and Hierarchical Priors for Learned Image Compression", NeurIPS, 2018, pp. 1-10 (10 p. total).

Balle et al., "Variational image compression with a scale hyperprior", arXiv:1802.01436v2 [eess.IV] May 1, 2018, 2018, pp. 1-23 (23 pages total).

* cited by examiner

Huffman coding process 803

805

| Symbol | Bitstream |
|---|---|
| A | 0 |
| B | 10 |
| C | 11 |

Symbol-bitstream LUT

LUT obtained by PMF information

LEARNING METHOD OF NEURAL CODEC, ENCODING AND DECODING METHOD OF NEURAL CODEC

CROSS-REFERENCE TO RELATED APPLICATIONS

This application claims the benefit under 35 USC § 119(a) of Korean Patent Application No. 10-2024-0108836, filed on Aug. 14, 2024, in the Korean Intellectual Property Office, the entire disclosure of which is incorporated herein by reference for all purposes.

BACKGROUND

1. Field

The following embodiments relate to a learning method of a neural codec, and an encoding and decoding method of a neural codec.

2. Description of Related Art

With the rapid development of techniques using an artificial neural network, video compression and restoration techniques based on an artificial neural network have been rapidly developed. A neural codec may learn a feature of input data using a neural network and may compress and restore the input data based thereon. In the neural codec, entropy coding may be used to improve compression efficiency of data and decrease a transmission bandwidth.

SUMMARY

According to an aspect of the disclosure, an encoding method of a neural codec performed by at least one processor includes encoding input data to a first latent vector of a quantized representation; generating, after encoding the input data, a bitstream corresponding to the input data by channel-wise grouping and entropy encoding the first latent vector; and transmitting the bitstream.

According to an aspect of the disclosure, the generating the bitstream further includes: grouping channels of the first latent vector; predicting a distribution of probability mass functions (PMFs) of frequencies of symbols respectively corresponding to the grouped channels of the first latent vector by an entropy layer of the neural codec; and generating the bitstream by entropy encoding the channels of the first latent vector based on the distribution of PMFs.

According to an aspect of the disclosure, the grouping of the channels of the first latent vector further includes: sequentially grouping the channels of the first latent vector according to an adjacent position.

According to an aspect of the disclosure, the neural codec comprises the entropy layer, and the predicting of the distribution of PMFs further comprises estimating the distribution of PMFs respectively corresponding to the grouped channels of the first latent vector in the entropy layer.

According to an aspect of the disclosure, the generating of the bitstream by entropy encoding the channels of the first latent vector further includes: performing the entropy encoding by grouping channels having a predetermined similarity of the distribution of the PMFs among the grouped channels of the first latent vector.

According to an aspect of the disclosure, the bitstream is generated by entropy encoding the grouped channels of the first latent vector using a look-up table (LUT) generated based on the distribution of PMFs.

According to an aspect of the disclosure, the LUT is generated by assigning, using Huffman coding, bits corresponding to the frequencies of the symbols to nodes of a binary tree and generating bit information corresponding to the nodes in which the symbols are positioned in the binary tree.

According to an aspect of the disclosure, the generating of the bitstream by entropy encoding the channels of the first latent vector further includes: generating the bitstream by differently adjusting a length of code generated according to the frequencies of the symbols by the entropy encoding.

According to an aspect of the disclosure, the encoding to the first latent vector further includes: generating an initial latent vector by encoding the input data; and generating the first latent vector by quantizing the initial latent vector.

According to an aspect of the disclosure, the generating of the first latent vector includes: clamping the initial latent vector in a predetermined range; and generating the first latent vector by quantizing the clamped initial latent vector.

According to an aspect of the disclosure, the neural codec is trained by a first loss between the input data and restored input data and a second loss based on a latency of the first latent vector.

According to an aspect of the disclosure, the neural codec is trained by adjusting at least one of a first weight corresponding to the first loss and a second weight corresponding to the second loss.

According to an aspect of the disclosure, a decoding method of a neural codec performed by at least one processor, includes: receiving a bitstream transmitted by a neural encoder; generating a second latent vector by entropy decoding the bitstream using a preset look-up table (LUT); and restoring the input data based on the first latent vector, in which the preset LUT is generated based on channels of a first latent vector grouped by a distribution of symbols respectively corresponding to channels of the first latent vector of a quantized representation in which the input data is encoded by the neural encoder.

According to an aspect of the disclosure, the distribution of symbols includes at least one of: a distribution of probability mass functions (PMFs) for frequencies of the symbols; and a distribution of symbol histograms based on the symbols.

According to an aspect of the disclosure, the bitstream is generated by entropy encoding grouped channels of the second latent vector using an LUT generated based on the distribution of PMFs.

According to an aspect of the disclosure, the LUT is generated by assigning, using Huffman coding, bits corresponding to the frequencies of the symbols to nodes of a binary tree and generating bit information corresponding to the nodes in which the symbols are positioned in the binary tree.

According to an aspect of the disclosure, a learning method of a neural codec including a neural encoder and a neural decoder, the method including: encoding input data to a first latent vector of a quantized representation by the neural encoder; generating, after encoding the input data, a bitstream corresponding to the input data by channel-wise grouping and entropy encoding the first latent vector; obtaining a second latent vector by entropy decoding the bitstream; restoring the second latent vector to the input data by the neural decoder; and learning the neural codec based on a difference between the input data and the restored input data.

According to an aspect of the disclosure, the generating of the bitstream includes: channel-wise grouping channels of the first latent vector; predicting a distribution of probability mass functions (PMFs) indicating frequencies of symbols respectively corresponding to the grouped channels of the first latent vector by an entropy layer of the neural codec; and generating the bitstream by entropy encoding the channels of the first latent vector based on the distribution of PMFs.

According to an aspect of the disclosure, the generating of the bitstream by entropy encoding the channels of the first latent vector includes: generating a look-up table (LUT) based on the distribution of PMFs; and generating the bitstream by entropy encoding the grouped channels of the first latent vector using the LUT.

According to an aspect of the disclosure, the generating of the LUT includes: assigning, by using Huffman coding, bits matching the frequencies of the symbols to nodes of a binary tree; and generating the LUT by bit information corresponding to the nodes in which the symbols are positioned in the binary tree.

Other features and aspects will be apparent from the following detailed description, the drawings, and the claims.

Figure 1A:
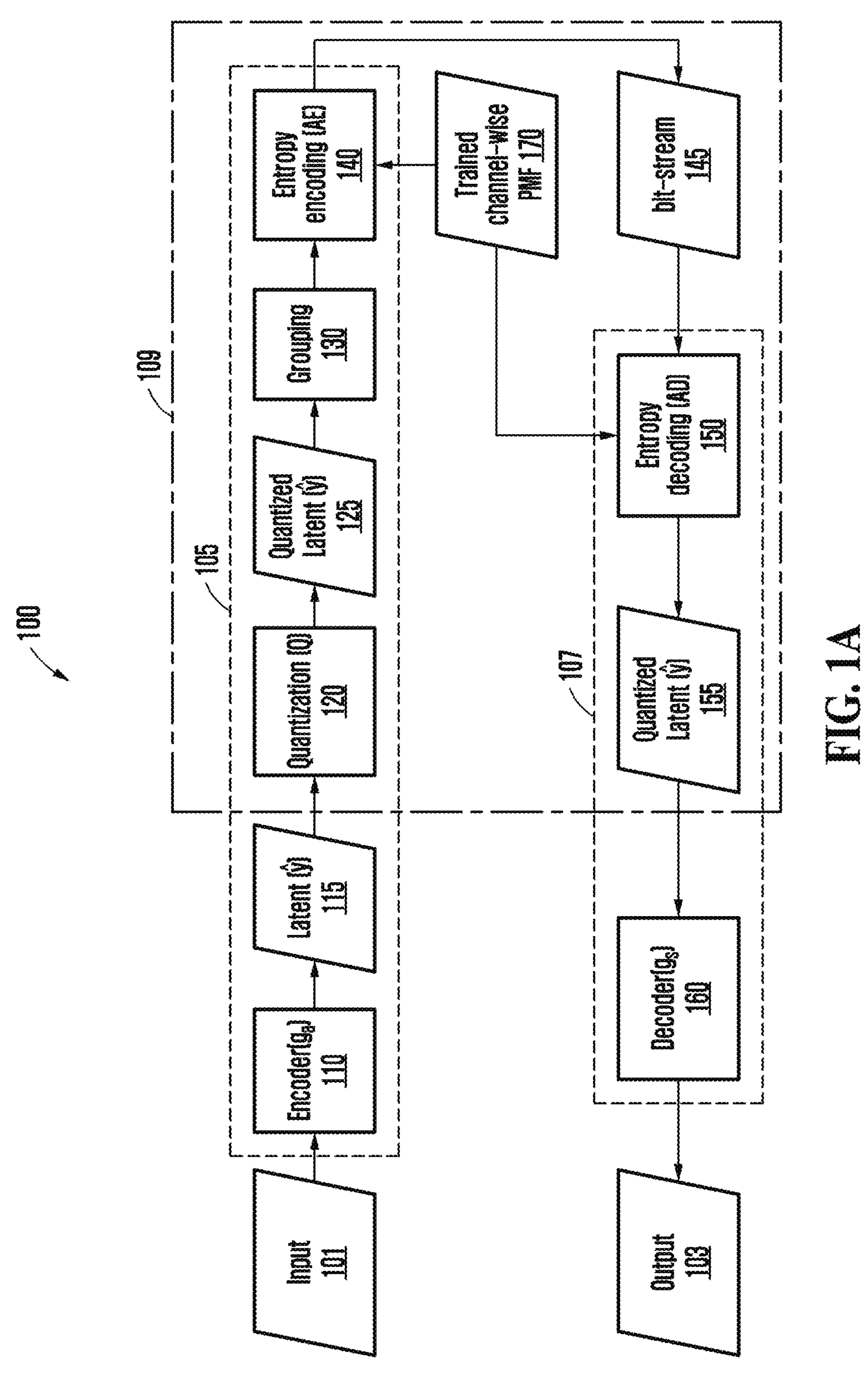
FIG. 1A is a diagram illustrating a structure and an operating process of a neural codec according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the embodiments. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if one component is described as being “connected”, “coupled”, or “joined” to another component, a third component may be “connected”, “coupled”, and “joined” between the first and second components, although the first component may be directly connected, coupled, or joined to the second component.

The singular forms “a,” “an,” and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The embodiments to be described below may be used for, for example, a content providing device for providing video content, a video broadcasting device, a terminal device for performing video transmission in a video call or a video conference, or a mobile application processor (AP).

Hereinafter, embodiments will be described in detail with reference to the accompanying drawings. When describing the embodiments with reference to the accompanying drawings, like reference numerals refer to like elements and a repeated description related thereto will be omitted.

FIG. 1A is a diagram illustrating a structure and an operating process of a neural codec according to one or more embodiments. Hereinafter, a process of generating a bitstream 145 from input data 101 by a neural codec 100 may be referred to as an "encoding process" and a part that performs the process in the neural codec 100 may be referred to as a "neural encoder 105". In embodiments, encoding the input data 101 may include compressing image data.

The neural encoder 105 may operate to be compatible with a standard video codec. The bitstream 145 generated by the neural encoder 105 may be interpreted by a decoder of a standard video codec or may be restored to an image by an arbitrary video decoder following the same standard. The neural encoder 105 may train a neural network to process an output corresponding to each of a plurality of input frames by a standard decoder. The standard decoder may include, for example, high efficiency video coding (HEVC), but is not limited thereto, and may include any type of video encoding such as moving picture experts group (MPEG), versatile video coding (VVC), etc.

The neural encoder 105 may train the neural network by, for example, unsupervised learning or self-supervised learning. The neural network may include a deep neural network. In addition, the neural network may include a convolutional neural network (CNN), a recurrent neural network (RNN), a perceptron, a multilayer perceptron, a feed forward (FF) network, a radial basis network (RBF), a deep feed forward (DFF) network, a long short-term memory (LSTM), a gated recurrent unit (GRU), an auto encoder (AE), a variational auto encoder (VAE), a denoising auto encoder (DAE), a sparse auto encoder (SAE), a Markov chain (MC), a Hopfield network (HN), a Boltzmann machine (BM), a restricted Boltzmann machine (RBM), a deep belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), a binarized neural network (BNN), a transformer, and an attention network (AN). The neural network may generally refer to a model having a problem-solving ability implemented through artificial neurons (or nodes) forming a network through synaptic connections where a strength of the synaptic connections is changed through training or machine learning. The artificial neurons of the neural network may include a combination of weights and/or biases and the neural network may include one or more layers including a plurality of artificial neurons.

As described below, the neural encoder 105 may perform unsupervised learning using a rate-distortion (RD) loss. As understood by one of ordinary skill in the art, unsupervised learning is a machine learning technique that uses algorithms to analyze unlabeled data and discover patterns.

In addition, a process of restoring output data 103 (originally the input data 101) by receiving the bitstream 145 transmitted by a transmission side may be referred to as a "decoding process", and a part for performing the process in the neural codec 100 may be referred to as a "neural decoder 107". Decoding the encoded input data may include decompressing or restoring the compressed input data.

Referring to FIG. 1A, the neural codec 100 according to one or more embodiments may receive the input data 101. The input data 101 may correspond to, for example, an image or a video to be compressed. In one or more examples, the input data 101 may correspond to a voice signal to be compressed.

The neural codec 100 may extract a latent vector 115 by applying the input data 101 to an encoder $g_a$ 110 and may encode the extracted latent vector 115. The encoder $g_a$ 110 may generate a latent vector 115 of which a dimension is reduced by extracting a feature from the input data 101.

The encoder $g_a$ 110 may extract and encode the latent vector 115 from the input data 101 by various image compression methods based on deep learning, such as a batch generation scheme or an iterative generation scheme. The batch generation scheme may train the neural network to simultaneously optimize an amount of bits required to express the latent vector 115, which is output as a result of image encoding, and distortion of a restored image, which is output as a result of decoding. In one or more examples, a latent vector may be a representation of data in a compressed, lower-dimensional space used in deep learning. A latent vector may be used to capture one or more important features of a dataset.

The encoder $g_a$ 110 may include, for example, a deep neural network (DNN), but is not limited thereto. The encoder $g_a$ 110 may be referred to as an "encoding network" or an "encoder neural network". The encoder $g_a$ 110 may transmit the latent vector 115 to a quantizer 120.

In one or more examples, since a volume of information may not be reduced significantly only by dimension reduction of the latent vector 115, the latent vector 115 may not be utilized for compression. Accordingly, the neural codec may generate a final bitstream 145 with a reduced information volume through quantization by the quantizer 120, grouping 130, and entropy encoding 140.

The quantizer 120 may generate a quantized latent vector 125 in an integer form by performing various quantization processes on the latent vector 115 output as the encoding result. Hereinafter, for ease of description, the quantized latent vector may be referred to as the "first latent vector 125". The quantizer 120 may generate the first latent vector 125 in which an amount of bits of the latent vector 115 is reduced through the quantization process. For example, the quantizer 120 may perform quantization on the latent vector 115 by scalar quantization, vector quantization, and/or embedded quantization other than quantization using a rounding operation.

Depending on the embodiment, operations of the encoder $g_a$ 110 and the quantizer 120 may be performed as a combined form of the encoder $g_a$ 110 and the quantizer 120.

The neural codec 100 may group 130 the first latent vector 125 in the unit of channels. The neural codec 100 may train the channel-wise grouped 130 first latent vector 125 with a probability mass function (PMF) 170 such that the bitstream 145 may include distribution information of the first latent vector 125 of various channels.

The neural codec 100 may generate the bitstream 145 corresponding to the input data 101 by performing entropy encoding 140 on the first latent vector 125 that is channel-wise grouped 130 in an entropy layer (e.g., an entropy layer 610 of FIG. 6B) of the neural codec 100. The entropy layer may be an entropy bottleneck layer, but is not limited thereto. The entropy layer is further described with reference to FIGS. 6B and 6C below.

The entropy encoding 140 may correspond to an encoding method that changes a length of code indicating a symbol according to an occurrence probability of the symbol corresponding to the channel-wise grouped 130 first latent vector 125. The neural codec 100 may assign short code to a symbol that occurs frequently by the entropy encoding 140 and may assign long code to a symbol that rarely occurs. The neural codec 100 may remove statistical redundancy of the input data 101 by the entropy encoding 140.

The neural codec 100 may learn the PMF 170 indicating the frequency of occurrence of symbols respectively corresponding to channels of the grouped 130 first latent vector 125 and may perform entropy coding by the PMF 170 that the neural codec 100 learns. The PMF 170 may correspond to a function indicating a probability with respect to a specific value in a discrete random variable.

The neural codec 100 may perform entropy coding by an entropy coder using the trained channel-wise PMF 170 corresponding to the channel of the first latent vector 125. The neural codec 100 may obtain frequency information from the PMF 170 generated for each channel to entropy code the first latent vector 125 or the PMF 170 generated for all first latent vectors 125. The neural codec 100 may perform entropy coding (e.g., the entropy encoding 140) using a coding table (e.g., a look-up table 805 of FIG. 8B) generated based on the frequency information.

When implementing the coding table in hardware, the coding table may be stored in a buffer and may occupy an area of a hardware device (e.g., a mobile terminal or an image display device) proportional to the number of coding tables. As described above, the area of the coding table may be large depending on a hardware environment, and thereby, a neural network may not be mounted on the hardware device due to the coding table.

After an entropy layer (e.g., the entropy bottleneck layer) learns all symbols appearing in the first latent vector 125 and the frequency information on each symbol, the entropy layer may become a look-up table (LUT). For example, when a range of the first latent vector 125 changes and data having a different range from the trained data is input, an error may occur since a symbol that does not exist in the LUT is input.

Accordingly, in one or more embodiments, the error described above may be prevented by outputting the first latent vector 125 in a predetermined fixed range by clamping the first latent vector 125 (e.g., latent vector is restricted to values between a minimum value and a maximum value). In addition, the entropy layer may be efficiently optimized by learning a probability distribution (e.g., the PMF 170) in a limited range.

In addition, in one or more embodiments, while performing the entropy coding 140 or 150 on the first latent vector 125, the area for mounting the neural codec 100 on a hardware device (e.g., a mobile application processor (AP)) may be secured by grouping the information on the PMF 170 trained for each channel and power consumption may be reduced by decreasing a data movement bandwidth between an intellectual property (IP) in a system on chip (SoC) and dynamic random-access memory (DRAM).

In one or more embodiments, the number of latent vectors may be maintained while entropy coding the first latent vector 125 generated during the encoding process of the neural codec 100 and the hardware usage area may be reduced using fewer LUTs.

The neural codec 100 may transmit the bitstream 145 generated by the entropy encoding 140 to, for example, a neural decoder 107 of a reception-side device.

When the neural decoder 107 receives the bitstream 145, a second latent vector 155 may be obtained by performing the entropy decoding 150 on the bitstream 145.

The neural decoder 107 may generate the output data 103 obtained by restoring the second latent vector 155 to the input data 101 by a decoder $g_s$ 160. The decoder $g_s$ 160 may be referred to as a "decoding network" or a "decoder neural network".

The neural codec 100 may perform training based on a difference between the input data 101 and the input data 101 restored by the decoder $g_s$ 160, in other words, a difference between the input data 101 and the output data 103.

The encoder $g_a$ 110, the quantizer 120, the entropy coders 140 and 150, and the decoder $g_s$ 160 included in the neural codec 100 may be implemented as an entropy layer 109 of the neural network and may be end-to-end trained. As described with reference to FIG. 1B below, each neural network may be trained while adjusting a weight with a bitrate obtained by the PMF 170 predicted by the entropy layer 109 of the neural codec 100 to minimize the difference between the input data 101, which is the original data, and the output data 103, which is the restored data.

After the neural codec 100 converts a pixel-wise image into quantized latent information (e.g., the first latent vector 125) through the neural network, the neural codec 100 may restore the quantized latent information to the pixel-wise image. In addition, the neural codec 100 may perform quantization and/or entropy encoding to reduce an amount of bits of the latent information while maintaining the image quality of a restored image. In this case, the amount of bits of the latent information may be finalized by the entropy encoding 140, which is a lossless compression technique. The neural codec 100 may improve the compression performance by a rate-distortion optimization method using an entropy layer described below. The neural codec 100 may train the entropy layer 109 (e.g., an entropy layer 186 of FIG. 1B) based on the neural network to reduce the entropy of the first latent vector 125 on which conversion by the encoder $g_a$ 110 and quantization by the quantizer 120 are performed and may use the entropy layer 109 for probability distribution estimation.

A loss function L may optimize the neural network structure by the end-to-end training scheme of the neural codec 100, and for example, may use a weighted sum of a bitrate loss R and a distortion loss D as Equation 1 below.

$$L = R + \lambda \times D(x, \hat{x}) \quad \text{[Equation 1]}$$

In this case, the distortion loss D may correspond to a decoded frame. For example, a term indicating an error of the restored input data 101. The distortion loss D may be mathematically defined based on the difference between the obtained (restored) output data 103 and the input data 101 by performing decoding using a prediction result of the neural network. The distortion loss D may be referred to as a "restoration error" because the distortion loss D corresponds to an error occurring due to restoration. When the input data 101 is image data, the distortion loss D may be related to the image quality of the image data.

For example, the distortion loss D may be calculated using a peak signal-to-noise ratio (PSNR) or a multi-scale structural similarity index measure (MS-SSIM) between the input data 101 corresponding to an original image x and the output data 103 corresponding to a restored image $\hat{x}$, but is not limited thereto.

In this case, the decoder $g_s$ 160 may be a module including a differentiable operator or may be implemented such that the encoder $g_a$ 110 may learn through approximation. The distortion loss D may correspond to a "first loss" described with reference to FIG. 2 below.

The bitrate loss R may have a value corresponding to a length of the encoded bitstream 145. In one or more examples, when it is assumed that a probability distribution is ideally estimated, the bitrate loss R may be calculated by entropy of the latency information. For example, the bitrate loss R may be mathematically defined based on the entropy of the latent information. In this case, the bitrate loss R may be referred to as a "rate". The bitrate loss R may correspond to a "second loss" described below with reference to FIG. 2.

The parameter λ (lambda) may correspond to a constant or a weight that determines a ratio depending on the importance between the bitrate loss R and the distortion loss (restoration error) D. As the λ value increases, restoration distortion may decrease, but the bitrate may increase.

The neural codec 100 may be implemented in a personal computer (PC), a data server, or a portable device. The portable device may be implemented as a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, and/or a smart device. The smart device may be implemented as a smartwatch, a smart band, and/or a smart ring. In one or more examples, the functionality of the neural codec 100 may be distributed among one or more devices. In one or more examples, the neural codec 100 may be remotely located in a cloud server where an electronic device such as a computer or mobile phone communicates with the cloud server to provide data (e.g., input data) and receive data from the cloud server (e.g., output data of neural codec 100).

Figure 1B:
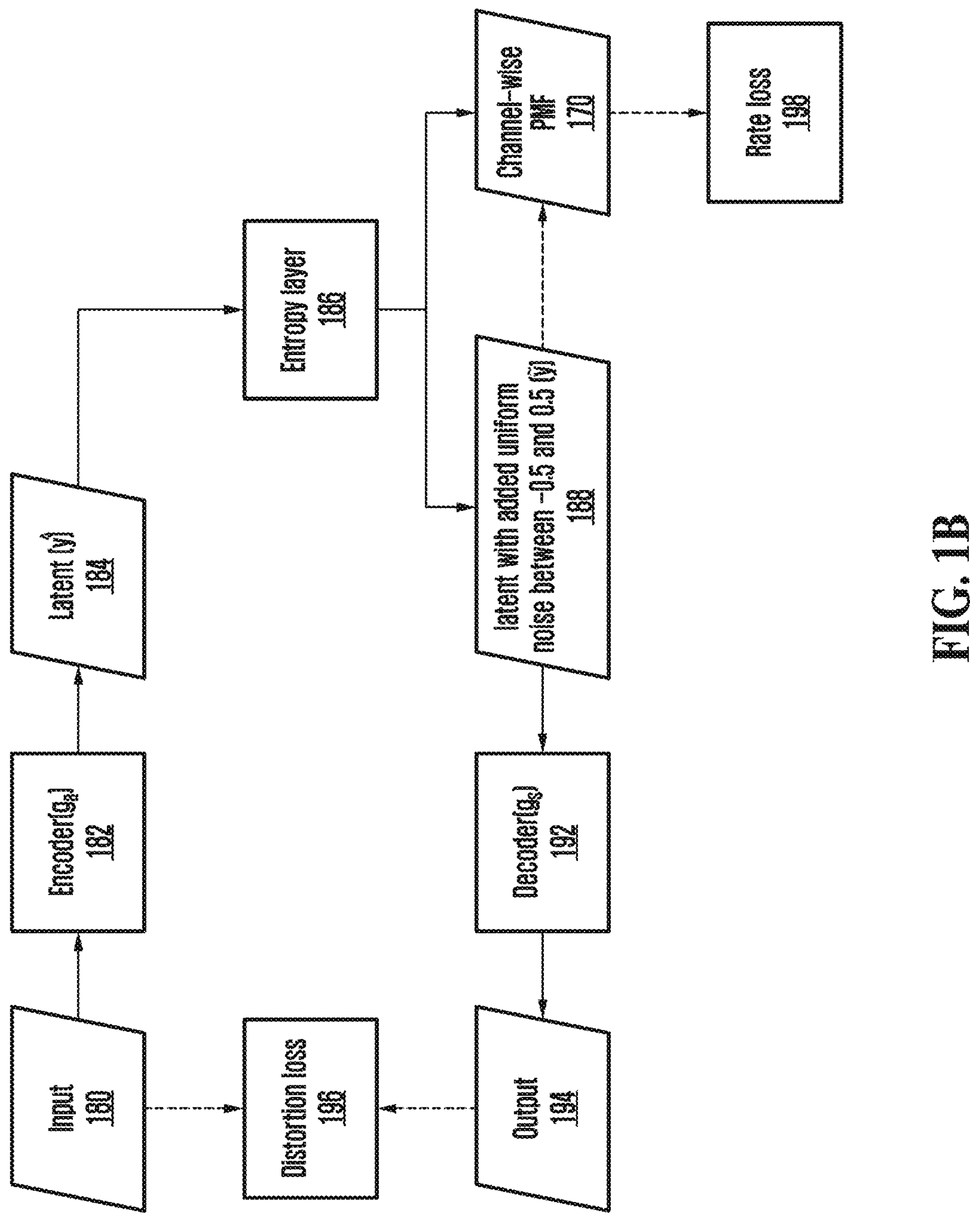
FIG. 1B is a diagram illustrating a learning process of an entropy layer of a neural codec according to one or more embodiments.

FIG. 1B is a diagram illustrating a learning process of an entropy layer of a neural codec according to one or more embodiments. Referring to FIG. 1B, a learning process of a neural codec including an entropy layer 186 that operates differently during learning and inference according to one or more embodiments.

The entropy layer 186 may be, for example, an entropy bottleneck layer, but is not limited thereto.

During the learning process, the neural codec may extract a latent vector 184 by applying input data 180 to an encoder 182. The neural codec may input the latent vector 184 to the entropy layer 186.

The entropy layer 186 may receive a latent vector that is not quantized during learning and may replace a round operation by adding uniform noise 188 between −0.5 and 0.5 rather than quantizing the round operation to flow a gradient during backpropagation. The latent vector with added noise may be input to a decoder 192 and may be restored to output data 194.

In this case, the entropy layer 186 may calculate the channel-wise PMF 170 by learning parameters, such as a weight and/or a bias value predicting a probability of each element in a latent representation (e.g., a latent vector).

For example, a loss subjected to backpropagation of parameters may be a bitrate loss R 198 calculated by Equation 2 below.

$$R = \frac{1}{N}\sum_{i=0}^{N} -\log_2(\text{likelihood}_i) \quad \text{[Equation 2]}$$

In this case, N is the number of latents. The bitrate loss R 198 may be obtained by calculating a likelihood value by multiplying the latent vector 188 to which the uniform noise is added by a weight, performing a matrix operation thereon, and adding a bias value thereto.

In addition, the neural codec may use a distortion loss D 196 other than the bitrate loss R during learning. The distortion loss D 196 may correspond to a mean squared error (MSE) between the input data 180 of the neural codec and the restored output data 194.

To summarize, a total loss L used for learning the neural codec may be expressed by Equation 1 $L=R+\lambda\times D(x,\hat{x})$ as described above and the neural codec may be trained to adaptively adjust a compression rate and/or the image quality of an image by adjusting the weight A.

For example, the neural codec may be trained such that when increasing the weight λ, the compression rate of the image may decrease as a weight is added to the distortion loss D 196 but the image quality of a restored image may be relatively improved. Conversely, the neural codec may be trained such that when decreasing the weight λ, the compression rate of the image may increase but the image quality of the restored image may relatively decrease.

Figure 2:
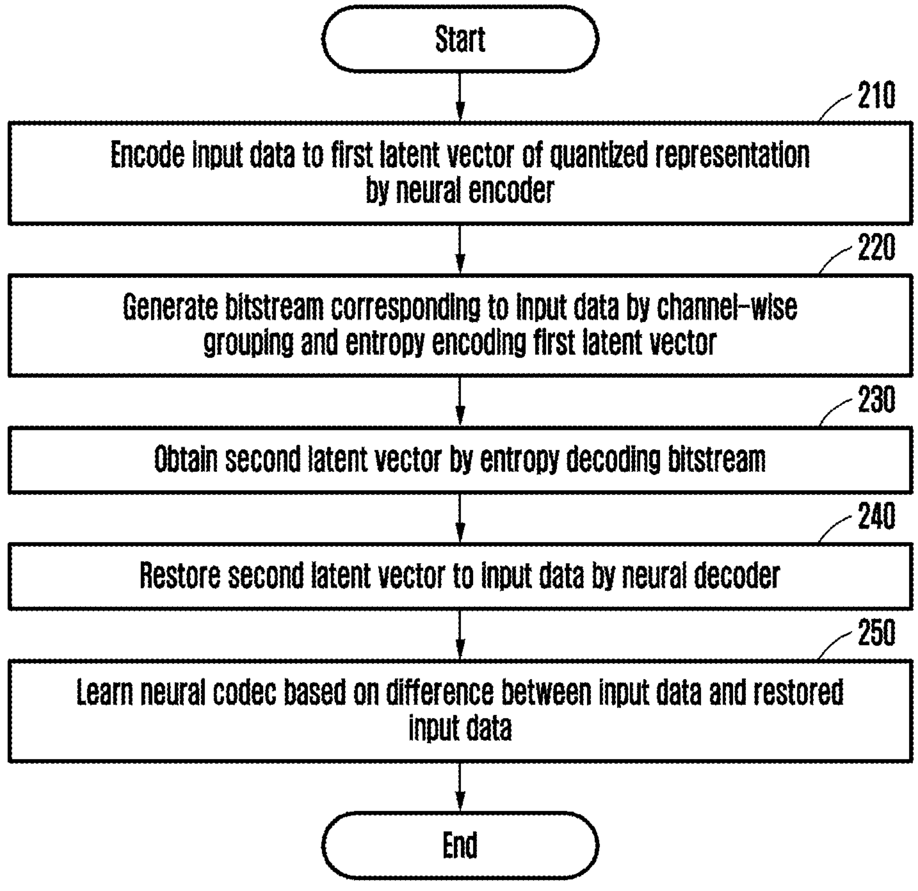
FIG. 2 is a flowchart of a learning method of a neural codec according to one or more embodiments.

FIG. 2 is a flowchart of a learning method of a neural codec according to one or more embodiments. Operations to be described hereinafter may be performed sequentially, but not necessarily performed sequentially. For example, the order of the operations may change and at least two of the operations may be performed in parallel.

Referring to FIG. 2, a neural codec (e.g., the neural codec 100 of FIG. 1) according to one or more embodiments may include a neural encoder (e.g., the neural encoder 105 of FIG. 1) and a neural decoder (e.g., the neural decoder 107 of FIG. 1) and the neural codec may learn through operations 210 to 250.

For example, the neural codec including the neural encoder and/or the neural decoder may be implemented on a mobile SoC on which a neural processing unit (NPU) is mounted. The neural encoder may be applied to various product groups performing video (image) compression. In addition, the neural decoder may be applied to various product groups performing video (image) restoration.

In operation 210, the neural codec may encode input data to a first latent vector, which is a quantized representation, by a neural encoder. The input data may be, for example, one of an image frame, a video frame, or an audio frame, but is not limited thereto. The neural encoder may have a form combined with an encoder (e.g., the encoder 110 of FIG. 1) and a quantizer (e.g., the quantizer 120 of FIG. 1), but is not limited thereto. After the neural codec generates a latent vector by encoding the input data, the neural codec may generate a first latent vector by quantizing the latent vector. For example, the neural codec may obtain the first latent vector in an integer form having a dimension of a channel C×height H×width W by quantizing the latent vector.

The neural codec may clamp the latent vector in a predetermined range and may generate the first latent vector by quantizing the clamped latent vector. In this case, the predetermined range may be, for example, an 8 bit range (−128 to +127), but is not limited thereto. In this case, when many first latent vectors exceeding the clamping range exist, information loss due to clamping may increase, but the loss may be minimized when applying clamping in advance in the learning process of the neural network model.

In addition, the neural codec may perform learning by restricting a range of an LUT of an entropy coder to be in the 8 bit range (−128 to +127) that is the same as the range of the first latent vector. As understood by one of ordinary skill in the art, the entropy coder may use a longer bit range (e.g., 16 bits) or a shorter bit range (e.g., 4 bits). The neural codec may train an LUT to have a different frequency in the predetermined range described above for each channel of the first latent vector. The neural codec may convert and transmit the first latent vector into a bitstream using the trained LUT to have a different frequency.

In operation 220, the neural codec may generate the bitstream corresponding to the input data by entropy encoding in the entropy layer by channel-wise grouping the first latent vector encoded in operation 210. A method of generating a bitstream by a neural codec is further described with reference to FIG. 3 below.

In operation 230, the neural codec may obtain a second latent vector by entropy decoding the bitstream generated in operation 220.

In operation 240, the neural codec may restore the second latent vector obtained in operation 230 to the input data by a neural decoder.

In operation 250, the neural codec may learn the neural codec based on a difference between the input data and the input data restored in operation 240. The neural codec may learn the neural codec by the first loss between the input data and the restored input data and the second loss based on the latency of the first latent vector, based on the difference between the input data and the restored input data in operation 240. In this case, for example, the first loss may correspond to the distortion D of Equation 1 described above and the second loss may correspond to the bitrate R of Equation 1 described above.

In addition, the neural codec may learn the neural codec by adjusting at least one of a first weight corresponding to the first loss and a second weight corresponding to the second loss. The weight may correspond to $\lambda$ of Equation 1 described above, but is not limited thereto.

Figure 3:
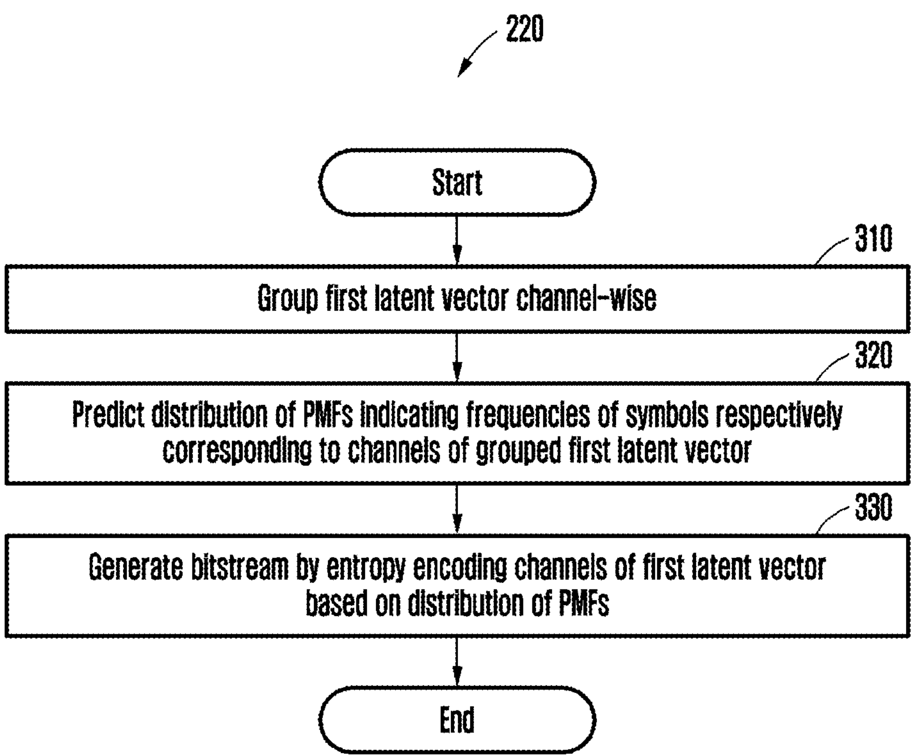
FIG. 3 is a flowchart of a method of generating a bitstream according to one or more embodiments.

FIG. 3 is a flowchart of a method of generating a bitstream according to one or more embodiments. Referring to FIG. 3, a neural codec according to one or more embodiments may generate a bitstream through operations 310 to 330. The operations illustrated in FIG. 3 may correspond to operation 220 in FIG. 2.

In operation 310, the neural codec may group first latent vectors by a channel. The method of grouping the first latent vector by a channel by the neural codec may be referred to FIGS. 5A and 5B below. For example, the neural codec may perform entropy encoding by sequentially grouping channels of the first latent vector depending on an adjacent position as FIG. 5A below or grouping channels of the first latent vector having a predetermined similarity of PMFs as FIG. 5B below.

In operation 320, the neural codec may predict a distribution of PMFs indicating the frequency of symbols respectively corresponding to the channels of the first latent vector that are grouped in operation 310. In this case, the distribution of PMFs respectively corresponding to the channels may refer to graphs shown in FIG. 4. The method of predicting a distribution of PMFs by a neural codec is further described with reference to FIG. 6A below. In addition, an entropy layer performing entropy coding is further described with reference to FIG. 6B below.

In operation 330, the neural codec may generate a bitstream by entropy encoding the channels of the first latent vector based on a distribution of the PMFs predicted in operation 320. The neural codec may generate the bitstream by differently adjusting the length of code generated according to the frequency of symbols by entropy encoding. The entropy coding in the neural codec may remove the statistical redundancy of data. The entropy coding may be implemented by changing the length of code according to an occurrence probability of a symbol. The neural codec may set a code for a most frequently appearing symbol to be the shortest and may set a code for a least frequently appearing symbol to be the longest by the entropy coding to optimize the number of bits representing the symbols. A method of generating a bitstream by entropy encoding by a neural codec is further described with reference to FIG. 7 below.

The neural codec may obtain distribution information by learning a PMF of the first latent vector and may secure a wider area when implementing the neural codec in hardware (e.g., a mobile AP) by reducing an area occupied by the distribution information of the PMF of the first latent vector in the memory by bundling and processing N distributions of channels. The neural codec may improve the performance using a deep neural network (DNN) with an additional layer by securing a wider area.

Figure 4:
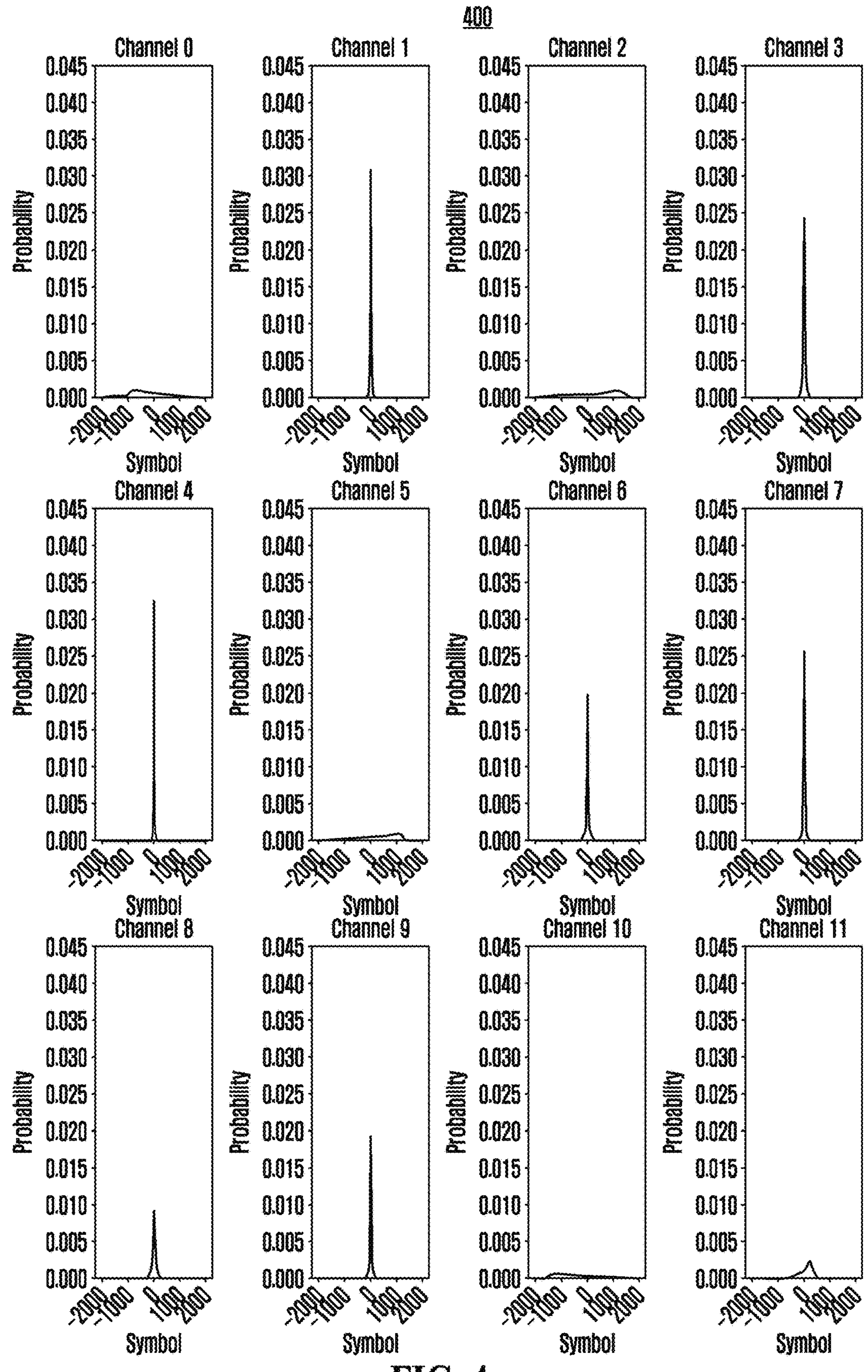
FIG. 4 is a diagram illustrating a distribution of probability mass functions (PMFs) of channels according to one or more embodiments.

FIG. 4 is a diagram illustrating a distribution of PMFs according to one or more embodiments. Referring to FIG. 4, a diagram 400 showing distribution graphs of PMFs of channels according to one or more embodiments is illustrated.

The PMFs of channels of the first latent vector may show a similar distribution to the diagram 400. For example, in the diagram 400, PMFs corresponding to channel 0 and channel 10 may show similar distributions to each other, PMFs corresponding to channel 2 and channel 5 may show similar distributions to each other, and PMFs corresponding to channel 1, channel 4, and channel 7 may show similar distributions to each other. Accordingly, channels with similar distributions may be grouped together. For example, channels that are within a predetermined probability value and/or predetermined frequency range may be grouped together.

The neural codec may perform entropy encoding by grouping the channels of first latent vector having a predetermined similarity of distributions of PMFs into one.

Figure 5A:
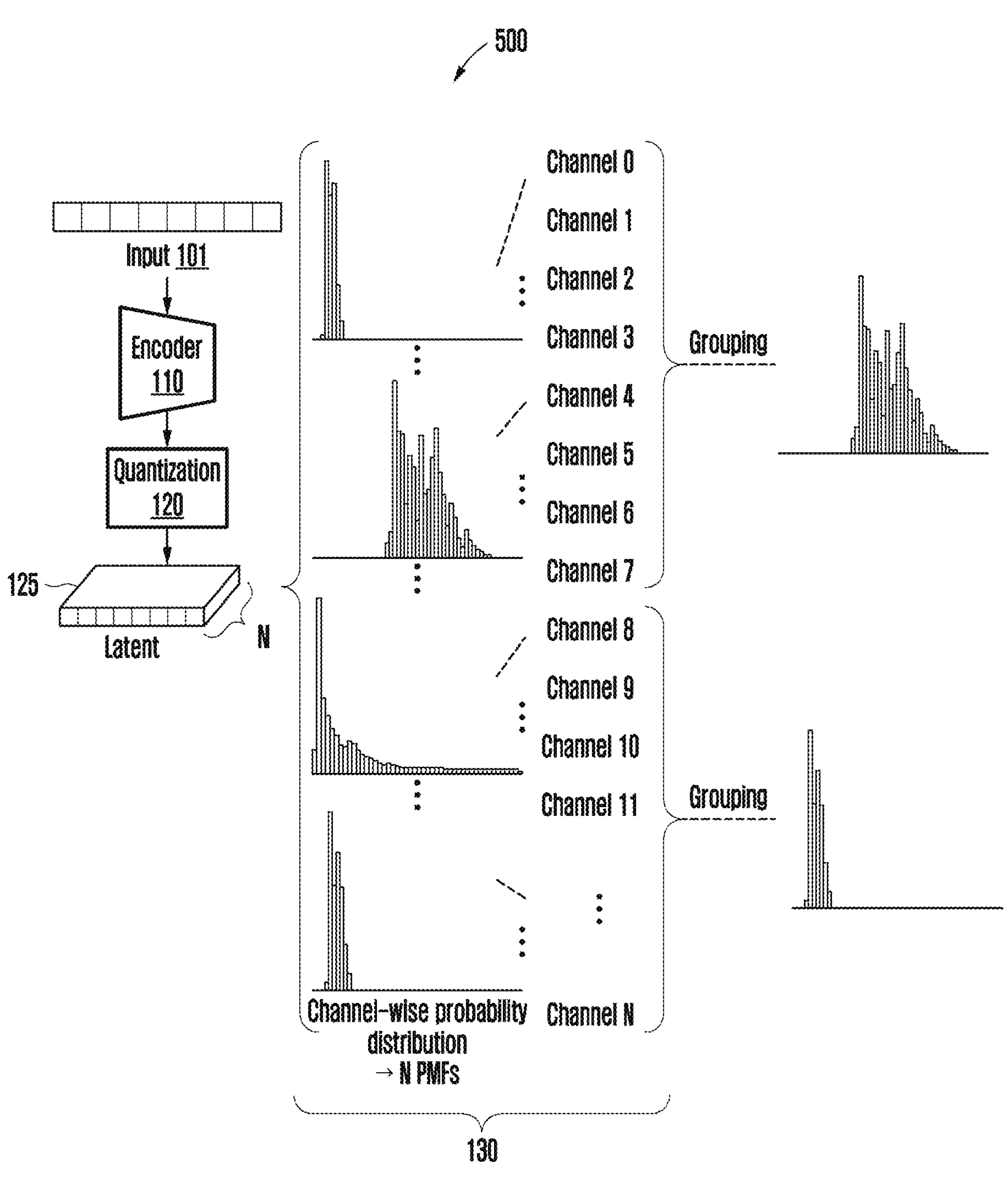
FIGS. 5A and 5B are diagrams illustrating a method of grouping a first latent vector by channels according to one or more embodiments.

FIG. 5A is a diagram illustrating a method of grouping a first latent vector by channels according to one or more embodiments. Referring to FIG. 5A, a diagram 500 showing a method of sequentially grouping channels of a first latent vector by a neural codec according to an adjacent position according to one or more embodiments is illustrated.

The neural codec may receive an image as the input data 101 and may output a latent vector by encoding the input data 101 by the encoder 110. For example, the neural codec may obtain the first latent vector 125 of an integer having a dimension of a channel C x height H x width W by quantizing the latent vector by the quantizer 120.

The neural codec may convert the first latent vector 125 into a bitstream through entropy encoding and may transmit the bitstream to the neural decoder. The neural decoder may obtain a second latent vector through entropy decoding on the bitstream and may restore an image by passing the second latent vector through a decoder.

The neural codec may learn PMF information by the number of channels of the first latent vector 125 and may perform entropy coding for each channel. The neural codec may maintain the number of latent vectors (e.g., the first latent vector 125) by performing entropy coding by grouping 130 the channel-wise PMF information during a process of entropy coding the first latent vector 125 generated during encoding and may secure an area for being mounted on the hardware using fewer LUTs. In this case, the neural codec may sequentially group the channels of the first latent vector 125 according to an adjacent position. For example, the neural codec may sequentially group channels 0, 1, 2, and 3 into one group according to an adjacent position, may group channels 4, 5, 6, and 7 into another group, and may group channels 8, 9, 10, and 11 into another group. In one or more examples, an adjacent position may refer to channels within a range (e.g., channels 0-N, where N is a positive integer). In or more examples, an adjacent position may refer to consecutive number channels. In one or more example, an adjacent position may refer to channels that are within a predetermined distance from each other (e.g., two channels that are separated by no more than one channel are adjacent).

Figure 5B:
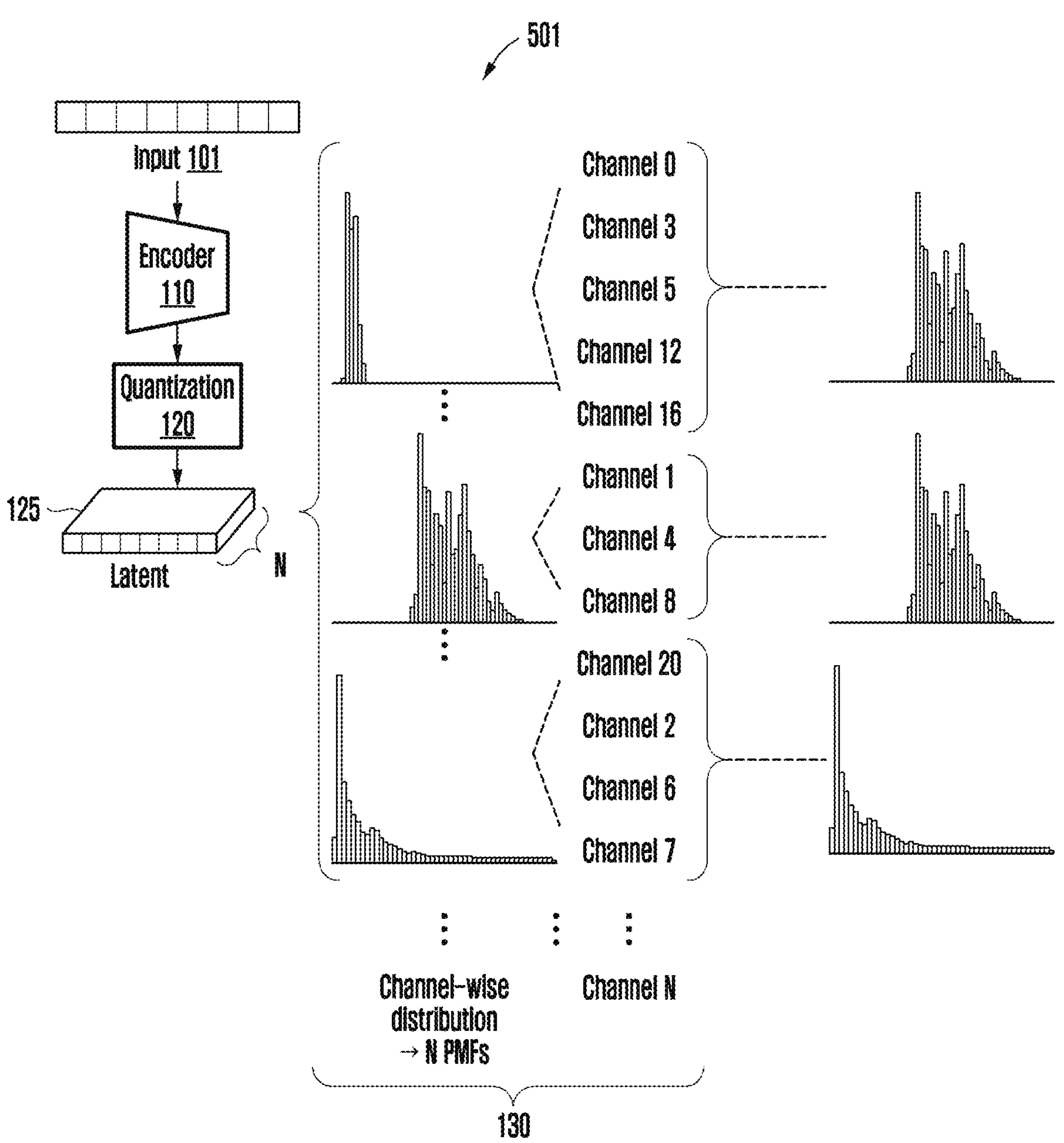

FIG. 5B is a diagram illustrating a method of grouping a first latent vector by channels according to one or more embodiments. Referring to FIG. 5B, a diagram 501 showing a method of grouping channels of the first latent vector showing a similar distribution by the neural codec according to one or more embodiments is illustrated.

As described with reference to FIG. 4, after a PMF of the first latent vector 125 is trained, the PMF for each channel may show a similar distribution.

The neural codec may perform entropy coding by grouping channels showing a similar distribution into one group. For example, channels 0, 3, 5, 12, and 16 may show similar distributions to each other, channels 1, 4, and 8 may show similar distributions to each other, and channels 20, 2, 6, and 7 may show similar distributions. In this case, the neural codec may group N PMFs into three groups, which are group 1 including channels 0, 3, 5, 12, and 16, group 2 including channels 1, 4, and 8, and group 3 including channels 20, 2, 6, and 7, according to the distribution by channel.

The neural codec may minimize performance degradation and may secure a hardware area by training or retraining the neural network by grouping channels having similar distributions. In other words, the neural codec may group channels sharing a category of symbols into one group.

After one training iteration, the neural codec may aggregate a value of PMFs of channels showing similar distributions and may perform inference by grouping latent vectors corresponding to the aggregated PMF.

In addition, the neural codec may reduce the number of PMFs by grouping channels having a predetermined similarity of distributions of PMFs by a PMF.

Figure 6A:
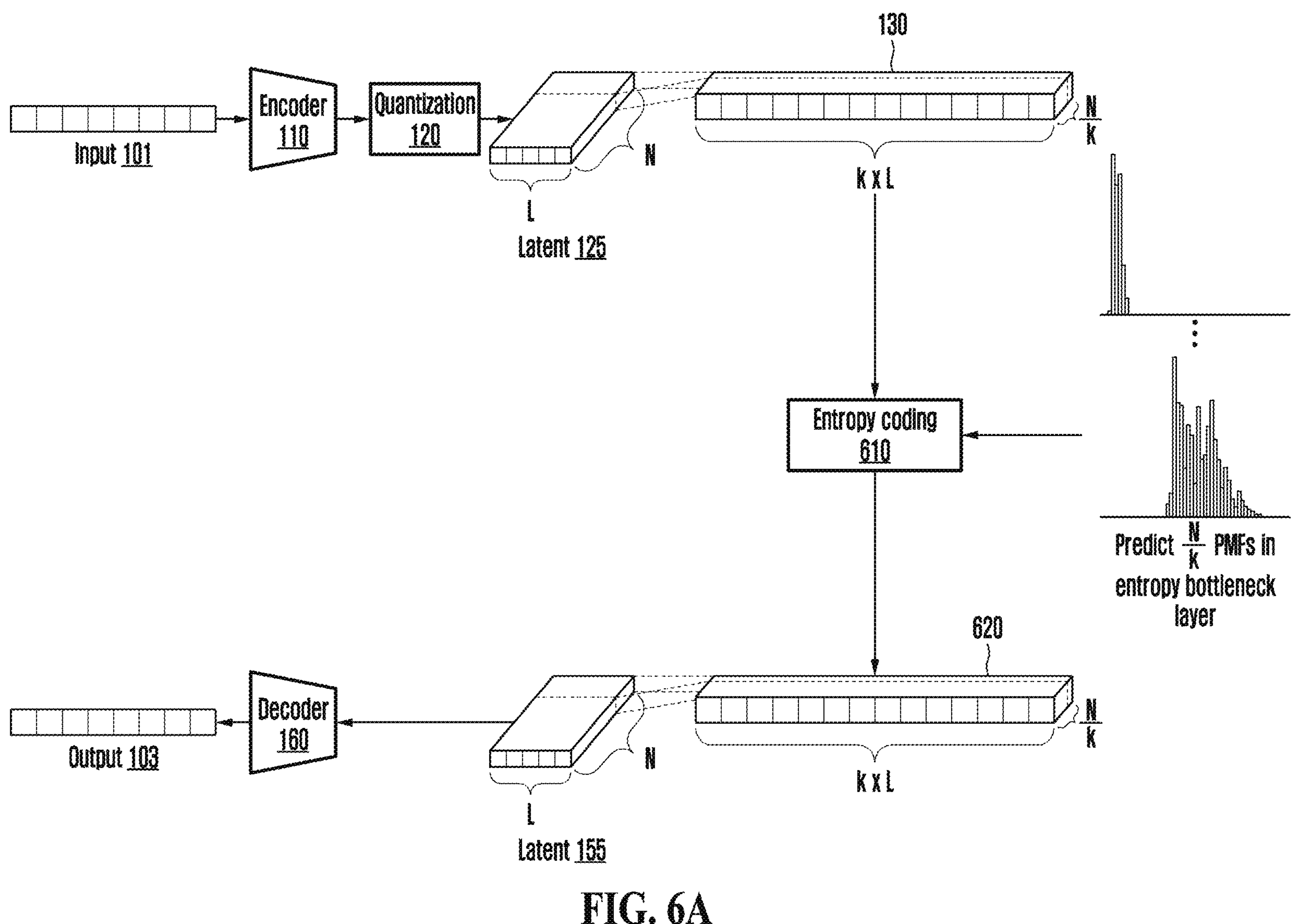
FIG. 6A is a diagram illustrating a method of predicting a distribution of PMFs in an entropy layer of a neural codec according to one or more embodiments.
Figure 6B:
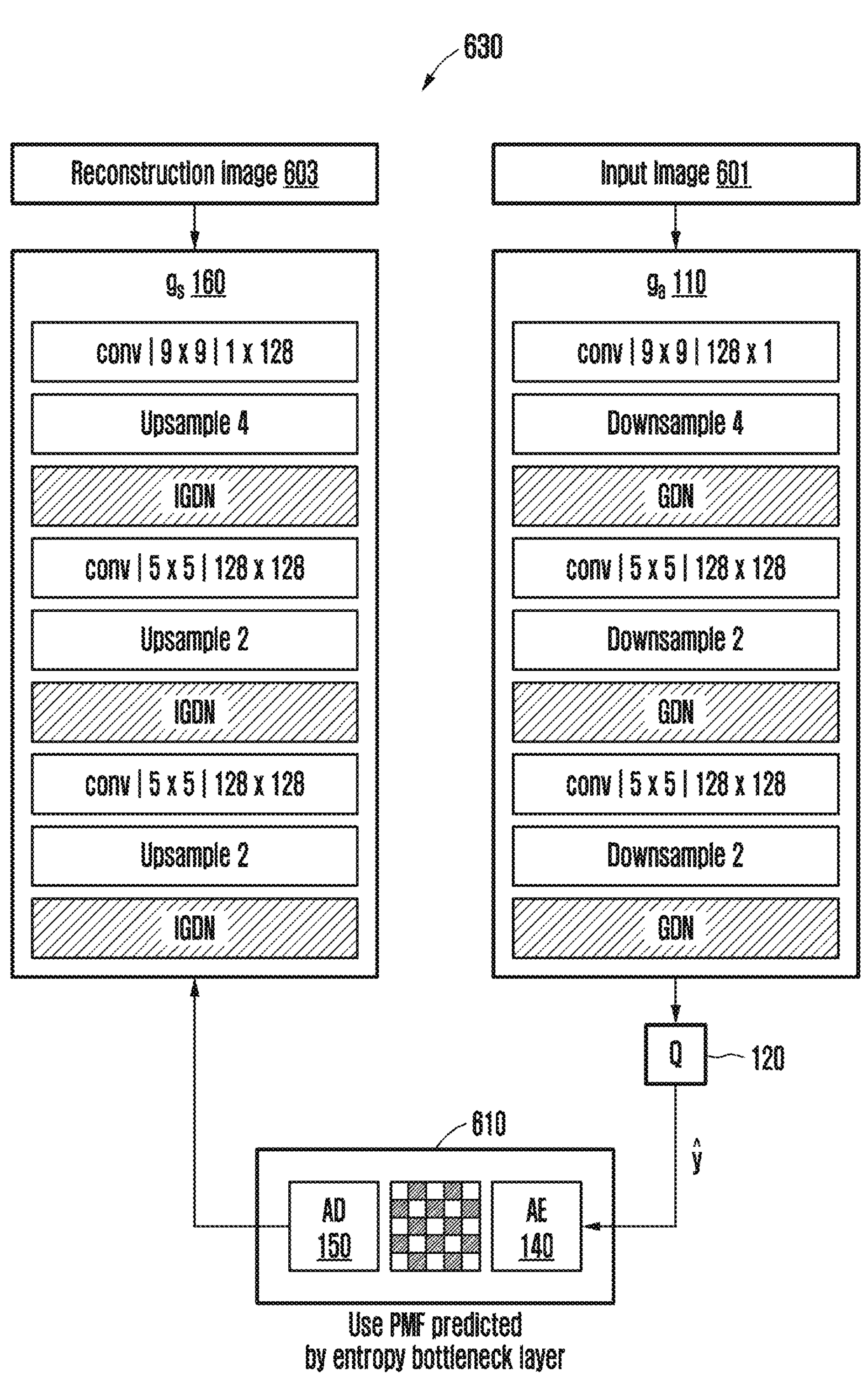
FIG. 6B is a diagram illustrating a structure of a neural codec that performs entropy coding according to one or more embodiments.

FIG. 6A is a diagram illustrating a method of predicting a distribution of PMFs in an entropy layer of a neural codec, according to one or more embodiments, and FIG. 6B is a diagram illustrating a structure of a neural codec that performs entropy coding according to one or more embodiments.

Referring to FIGS. 6A and 6B, a neural codec, according to one or more embodiments, may encode the input data 101 (e.g., an input image 601) by the encoder $g_a$ 110 and then may generate the first latent vector 125 through quantization by the quantizer 120. The neural codec may perform entropy coding by channel-wise grouping 130 the first latent vector 125 to secure the hardware area. In this case, the neural codec may ensure that the PMF trained by channel-wise grouping 130 the first latent vector 125 includes information about various channels. In addition, the neural encoder may group 130 the channels by restricting a range of the first latent vector 125 to, for example, an 8 bit range (e.g., −128 to +128). In this case, when the encoder $g_a$ 110 and the decoder $g_s$ 160 share the same range of latent vectors, only the frequency information may change and the number of symbols may be the same.

The neural encoder may group 130 the first latent vector 125 of which the width W is L and the number of channels is N by stacking k first latent vectors 125 in a channel direction. When grouping 130 N channels into N/k, the neural encoder may group 130 adjacent channels or may group 130 channels having similar distributions. The neural encoder may reduce the number of PMFs predicted by the entropy layer to N/k by grouping 130 channels sharing the category of symbols and passing through the entropy layer.

The neural codec may perform entropy coding on the first latent vector $\hat{\gamma}$ 125 using an entropy layer 610 (e.g., an entropy bottleneck layer) shown in a diagram 630 of FIG. 6B.

The entropy layer 610 may learn the PMF for each channel of the first latent vector 125. The entropy layer 610 may predict N/k PMFs through the grouping 130 described above and may generate the output data 103 (e.g., a reconstructed image 603) through the decoder $g_s$ 160. The "reconstructed image 603" may be referred to as a restored image.

A detailed image compression and decompression process using the entropy layer 610 may be performed in accordance with the following embodiments.

The entropy layer 610 may train the neural network end-to-end to achieve a balance between image compression efficiency and reconstruction fidelity.

In the image compression process, the neural codec may analyze and convert an input image x 601 by the encoder $g_a$ 110 into a latent vector y. The quantizer Q 120 may generate the first latent vector $\hat{\gamma}$ 125 corresponding to a latent representation of an integer value by discretizing each element of a latent image representation. In this case, the first latent vector $\hat{\gamma}$ 125 may not be a final compressed file. The first latent vector $\hat{\gamma}$ 125, which is a quantized latent representation, may be generated as a final compressed file through lossless entropy coding by the entropy encoder AE. The entropy layer 610 may provide probability prediction for each element of the first latent vector $\hat{\gamma}$ 125.

In the image decompression process, the neural codec may decompress a compressed file and may find and display an image. For example, the neural codec may restore the quantized latent representation by decoding the compressed file by the entropy decoder AD. The neural codec may generate a reconstructed image 603 displayed as the first latent vector $\hat{\gamma}$ 125 by reconverting the quantized latent representation into an image space through synthesis conversion by the decoder $g_s$ 160.

In the entropy layer 610, a probability of each element in a latent representation may be predicted. The core of a compression task may have two goals, which are a bitrate (e.g., coding efficiency considered as a compressed file size) and fidelity (reconstruction quality of decompressed image), and an inherent tradeoff may exist between the two goals. For example, to achieve a smaller file size, the quality may decrease due to a limited bit budget to express the data. Conversely, to achieve a high-quality reconstructed image, a file size may increase to capture more accurate detailed information.

Accordingly, in one or more embodiments, an optimal balance may be achieved by simultaneously optimizing the two goals by rate-distortion optimization as Equation 1 described above. In deep learning, the two goals described above may be achieved by, for example, a loss function, such as Equation 1.

In rate-distortion optimization, a rate loss term R, for example, each probability may be provided by an entropy layer and may be calculated by Shannon entropy. In addition, for example, a reconstructed loss term D may be calculated by an MSE or perceptual loss metrics.

During training, a derivative of a loss function for a network (e.g., the encoder $g_a$ 110 and the decoder $g_s$ 160) and parameters of the entropy layer 610 may need to be differentiated to allow backpropagation.

To use the entropy layer 610 for entropy coding, the entropy layer 610 may obtain a PMF required to configure an LUT by assessing a continuous distribution in the integer value.

The entropy layer 610 according to one or more embodiments may be, for example, an entropy bottleneck layer of the neural codec, but is not limited thereto. A probability of each element of the quantized latent representation in the entropy layer 610 (e.g., an entropy bottleneck) may be determined by a separate distribution. For example, for simplicity, the entropy layer 610 may be modeled such that an average of each element is "0" and each element may be predicted using a unique Gaussian distribution, which is a parameter with a trained scale. The entropy layer 610 may predict a probability (e.g., the PMF) using the Gaussian distribution and may output a probability value for each element.

The entropy layer 610 may determine a shape of the Gaussian distribution and may output the probability value for entropy coding through a distribution of each element of the latent representation. For example, the entropy layer 610 may estimate a probability of the quantized latent representation in the form of [batch size, channel, height of latent vector, and width].

For example, when there are two different images after analytical conversion and quantization, in a scenario for generating two different latent representations A and B, the entropy layer 610 may predict each element in the same dimension using the same Gaussian distribution having the same parameter. As a result, the entropy layer 610 may not adapt to a specific feature of an individual image and may not vary depending on the image.

Figure 6C:
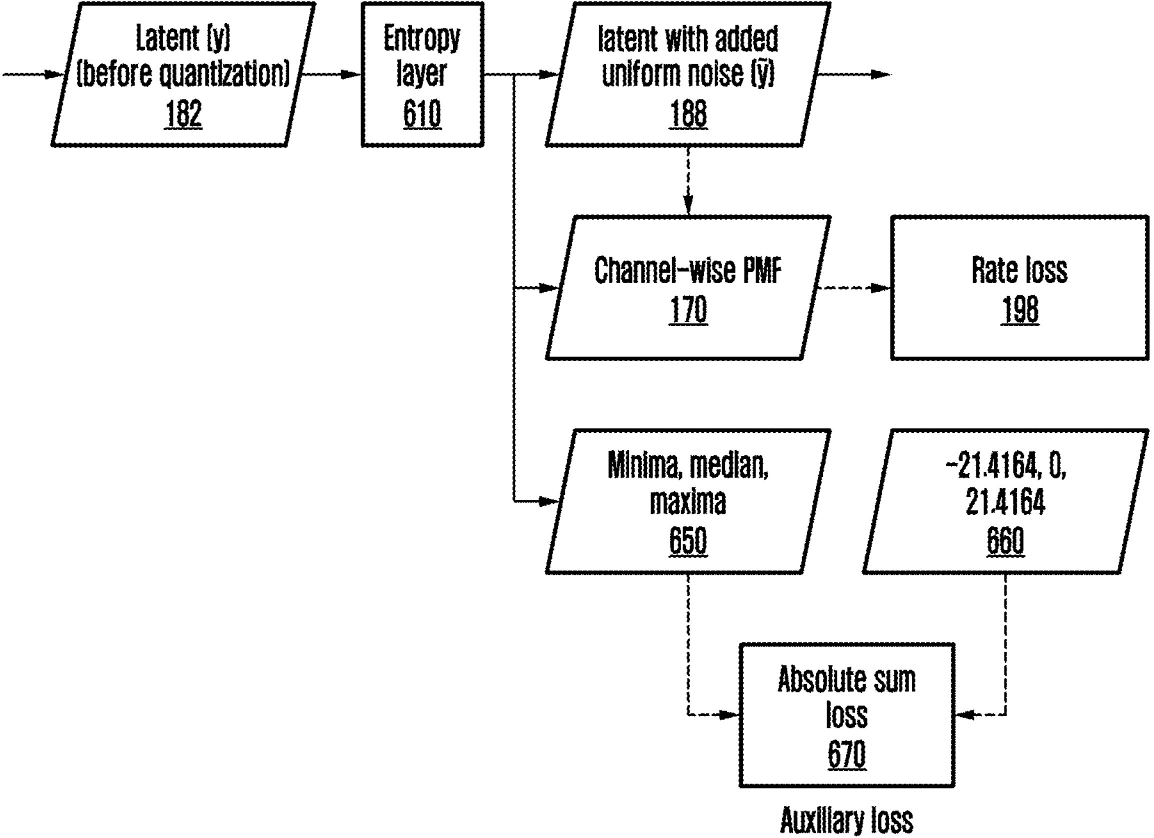
FIG. 6C is a diagram illustrating a learning process of an entropy layer of a neural codec according to one or more embodiments.

FIG. 6C is a diagram illustrating a learning process of an entropy layer of a neural codec according to one or more embodiments.

In the entropy layer 610 according to one or more embodiments, three values 650 (e.g., a minimum value (minima), a median value, and a maximum value (maxima)) for determining a symbol range and a weight and/or a bias value for predicting a probability of each element in a latent representation (e.g., a latent vector) may exist.

Accordingly, the entropy layer 610 may perform the two following roles using each value.

As described above, the entropy layer 610 may calculate a likelihood for an input latent vector (e.g., a latent vector before quantization) using the weight and the bias value.

For example, the entropy layer 610 may learn the PMF 170 by the latent vector 188 to which uniform noise between −0.5 and 0.5 is added. During the inference, the entropy layer 610 may predict a discretized PMF 170.

When quantizing with a round operation during the learning, a gradient may break and the learning may not be performed. Accordingly, the entropy layer 610 may add a random value between −0.5 and 0.5 to the latent vector to round up instead of the round operation. The entropy layer 610 may estimate the channel-wise PMF 170 by the latent vector 188 to which the random value between −0.5 and 0.5 is added, and may calculate the rate loss R 198 according to the method described above.

In addition, the entropy layer 610 may learn a symbol range of the coding table described above by an auxiliary loss 670. In this case, the auxiliary loss 670 may be, for example, an absolute sum loss, but is not limited thereto. The absolute sum loss may be one of loss functions used for machine learning and may be an absolute difference between a predicted value and a real value. The absolute sum loss may be referred to as a "mean absolute error (MAE)" or an "L1 loss".

The entropy layer 610 may have the three values 650 (e.g., [minima, median, maxima]) and may be assumed that a cumulative distribution function (CDF) has a sigmoid function form. For example, to stably proceed with the learning, the entropy layer 610 may ensure that a CDF value of a symbol having minima is $$\frac{10^{-9}}{2},$$

a CDF value of a symbol having median is 0.5, and a CDF value of a symbol having maxima is $$1-\frac{10^{-9}}{2}.$$

The entropy layer 610 may perform learning by using a sum of absolute differences between [minima, median, maxima] 650 and a [−21.4164, 0, 21.4164] value 660 as the auxiliary loss 670.

For example, a sigmoid equation may be expressed by when $$y=\frac{1}{1+e^{-x}}x=\ln\left(\frac{y}{1-y}\right),$$

may be satisfied. In this case, when inputting $$\frac{10^{-9}}{2},\ 0.5,\ 1-\frac{10^{-9}}{2}\text{ to }y,$$

[−21.4164, 0, 21.4164] (660) may be obtained as the x value.

When the neural codec updates a parameter by the auxiliary loss 670, the neural codec may stop backpropagating a gradient for other portions of the network and may update a loss only for the three values 650 (e.g., [minima, median, maxima]). The entropy layer 610 may predict the PMF 170 having a range of the minima to the maxima for each channel. When the neural codec is trained by the auxiliary loss 670, the neural codec may use the minima in the form of decimals during the inference process.

For example, the neural codec may quantize 120 a result reflecting the minima in the form of decimals in the latent vector 115 extracted by the encoder in FIG. 1A. In this case, the neural codec may cause the latent vector to have a range greater than the minima by outputting a result obtained by subtracting the minima in the form of decimals from the quantized second latent vector 155 through the entropy decoding 150 in the decoding process of FIG. 1A.

Figure 7:
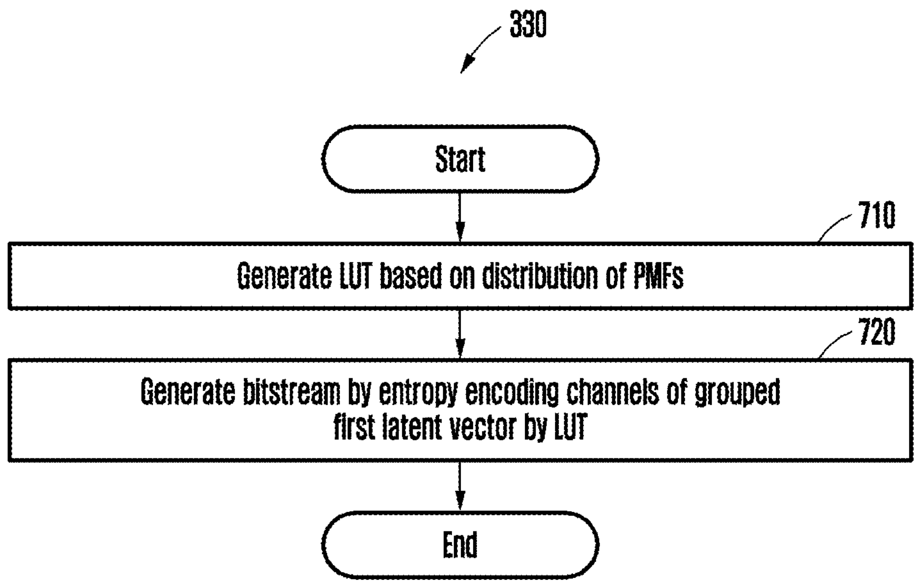
FIG. 7 is a flowchart of a chamber for generating a bitstream by entropy encoding channels of a first latent vector according to one or more embodiments.

FIG. 7 is a flowchart of a chamber for generating a bitstream by entropy encoding channels of a first latent vector, according to one or more embodiments. Referring to FIG. 7, the neural codec, according to one or more embodiments, may generate a bitstream through operations 710 to 720.

In operation 710, the neural codec may generate an LUT based on a distribution of PMFs. The neural codec may assign bits matching frequencies of symbols (e.g., symbols respectively corresponding to channels of a grouped first latent vector) to nodes of a binary tree. For example, the neural codec may assign the bits to the nodes of the binary tree by Huffman coding described with reference to FIG. 8A below. The Huffman coding may correspond to an example of a lossless compression method performing statistical compression using a frequency (or probability information) of a character (or a symbol).

The neural codec may compare the frequencies of symbols with a predetermined criterion. Based on a comparison result, as the frequencies of the symbols are greater than the predetermined criterion, the neural codec may assign to nodes at a lower depth in the binary tree, and as the frequencies of the symbols are less than the predetermined criterion, the neural codec may assign to nodes at a higher depth in the binary tree. The neural codec may generate an LUT by bit information corresponding to the nodes in which the symbols are positioned in the binary tree.

In operation 720, the neural codec may generate a bitstream by entropy encoding the channels of the grouped first latent vector by the LUT generated in operation 710. The neural codec may entropy encode the channels of the grouped first latent vector by an entropy coder. The entropy coder may learn all symbols appearing in the grouped first latent vector and the frequency information of each symbol by the LUT. However, when a range of the grouped first latent vector changes, data having a different distribution from the trained data is input, and an error may occur because a symbol that does not exist in the LUT is output.

By outputting the first latent vector in a fixed range, the neural codec according to one or more embodiments may prevent the error that occurs because a symbol that does not exist in the LUT is output and may efficiently optimize the entropy coder because the neural codec learns the distribution in a limited range.

Figure 8A:
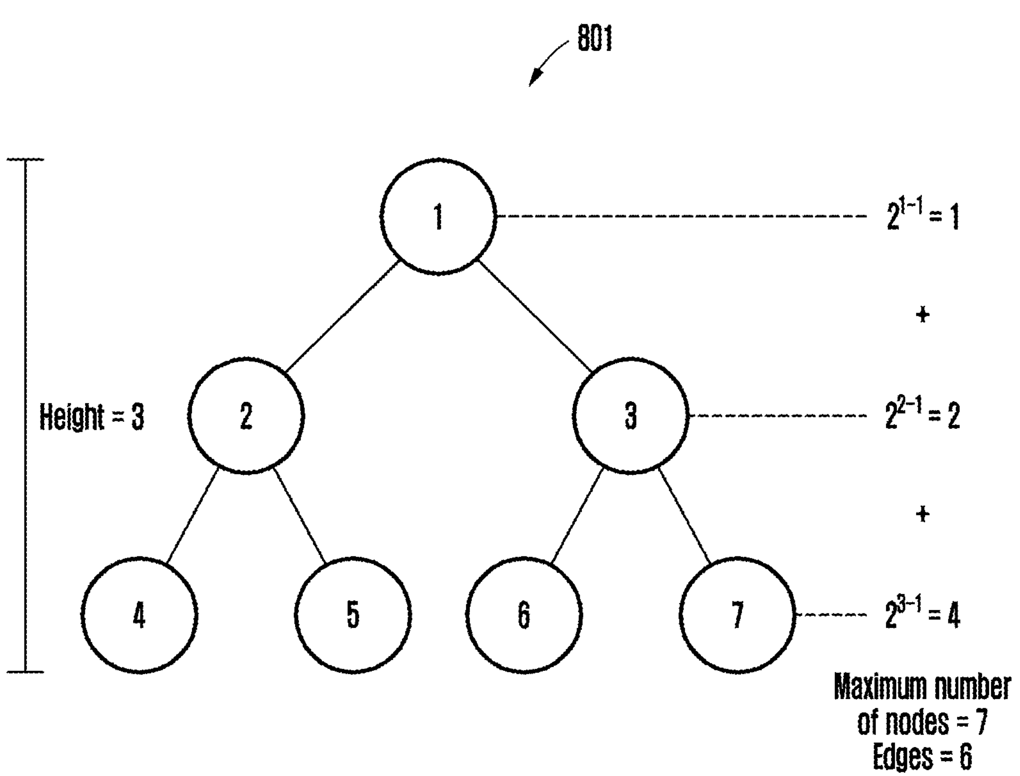
FIG. 8A is a diagram illustrating a Huffman coding method used for a look-up table (LUT) generation process according to one or more embodiments.
Figure 8B:
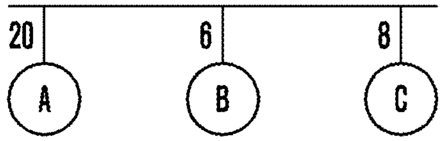
FIG. 8B is a diagram illustrating a method of generating an LUT according to one or more embodiments.
Figure 8B:
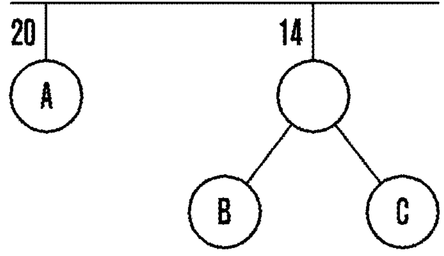
Figure 8B:
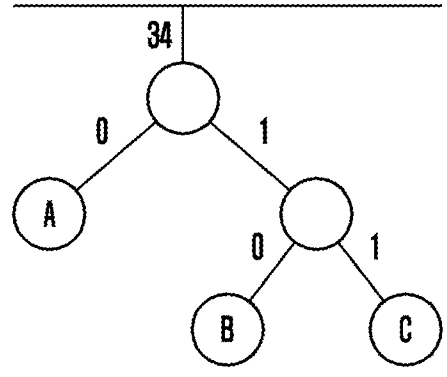

FIG. 8A is a diagram illustrating a Huffman coding method used for a look-up table (LUT) generation process according to one or more embodiments and FIG. 8B is a diagram illustrating a method of generating an LUT according to one or more embodiments.

Referring to FIG. 8A, according to one or more embodiments, a binary tree structure 801, in which a height (or a depth) is 3, the maximum number of nodes is 7 (1+2+4), and the number of edges is 6, is illustrated.

The information used for entropy coding may be a frequency value of an integer symbol subjected to compression. The neural codec may learn a distribution of PMFs and may calculate a frequency value of each symbol using the distribution of PMFs that the neural codec learns.

According to a Huffman coding process 803, which is a representative scheme of generating an LUT, the neural codec may obtain a frequency value of an integer symbol using the binary tree structure 801 as FIG. 8A and may generate bitstreams (bits) matching each symbol shown in an LUT 805 of FIG. 8B.

In the Huffman coding probability 803, numbers (e.g., 20, 6, and 8) written next to each node may represent a PMF value corresponding to each symbol. The neural codec may generate a binary tree structure with the frequency information (e.g., a PMF value) corresponding to each symbol and may generate the LUT 805 based on the binary tree structure.

More specifically, the neural codec may assign a symbol (e.g., symbol A) with a high frequency to a node having a small height (or depth) value in the LUT 805 of FIG. 8B and may assign a symbol (e.g., symbol C) with a low frequency to a node having a great height (or depth) value in the LUT 805 to optimize the number of bits used for the symbols (e.g., symbols that occur more frequently use a smaller number of bits). As described above, the neural codec may improve compression efficiency by assigning short binary code (Huffman code) to a high-frequency symbol and assigning long binary code to a low-frequency symbol.

The neural codec may generate the LUT 805 with a symbol obtained based on the information of the PMF. The neural codec may generate the LUT 805 using bit information corresponding to a node in which the symbol is positioned in the binary tree structure. The neural codec may perform entropy coding using the LUT 805. For example, when performing entropy encoding, if the neural codec receives symbol A, the neural codec may encode as bitstream "0" and if the neural codec receives symbol B, the neural codec may encode as bitstream "10", according to the LUT 805. In addition, when performing entropy decoding, if the neural codec receives bitstream "0", the neural codec may decode as symbol A, and if the neural codec receives bitstream "11", the neural codec may decode as symbol C, according to the LUT 805.

The entropy layer used by the neural codec may use entropy bottleneck LUTs as the number of channels of the latent vector. Therefore, when implementing the LUT in hardware, for example, PMF values of channels showing similar distributions among the PMF values corresponding to the channels as shown in FIG. 8B may be used to efficiently use an area of the LUT. For example, channels 1, 2, and 3, of which PMF values of symbols A, B, and C are (20, 6, 8), (21, 7, 9), and (10, 20, 15), respectively, may exist. In this case, the neural codec may group channel 1 and channel 2, which are channels having similar PMF values, into one group. The neural codec may reduce the number of PMFs by performing inference by selecting one from (20, 6, 8) and (21, 7, 9) as the value of PMFs of the grouped channels 1 and 2.

According to one or more embodiments, the number of LUTs 805 to be stored in a buffer in hardware implementation may be reduced by reducing the number of PMFs through channel grouping described above, and thereby, a mobile AP using a thin neural network structure may be assisted by securing a hardware area while maintaining a latent capacity.

Figure 9:
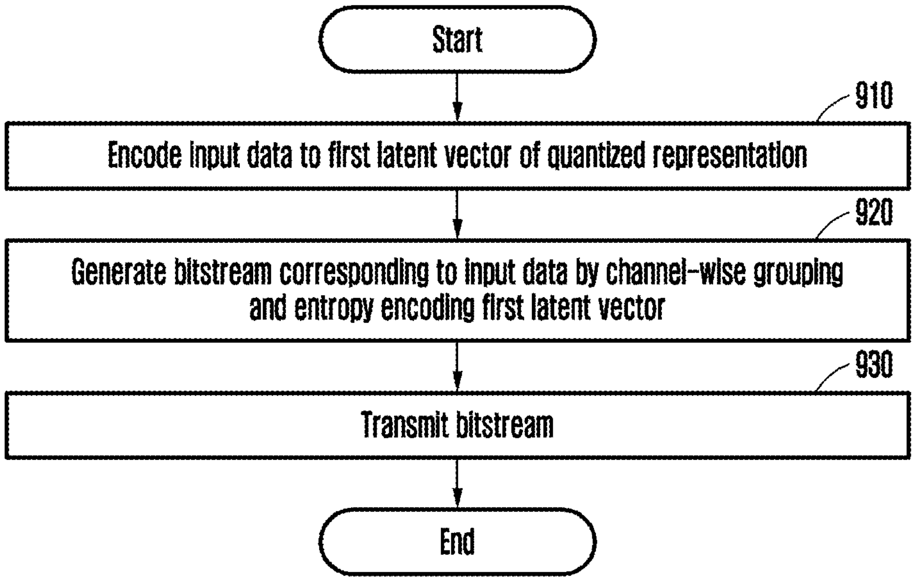
FIG. 9 is a flowchart of an encoding method of a neural codec according to one or more embodiments.

FIG. 9 is a flowchart of an encoding method of a neural codec, according to one or more embodiments. Referring to FIG. 9, a neural codec, according to one or more embodiments, more specifically, a neural encoder of the neural codec may generate and transmit a bitstream from input data through operations 910 to 930.

In operation 910, the neural encoder may encode the input data to a first latent vector of a quantized representation.

In operation 920, the neural encoder may generate a bitstream corresponding to the input data by entropy encoding by channel-wise grouping the first latent vector encoded in operation 910. The neural encoder may group channels of the first latent vector. The neural codec may predict a distribution of PMFs for frequencies of symbols respectively corresponding to the channels of the grouped first latent vector. The neural encoder may generate a bitstream by entropy encoding the channels of the first latent vector based on the distribution of PMFs.

In operation 930, the neural encoder may transmit the bitstream generated in operation 920.

Figure 10A:
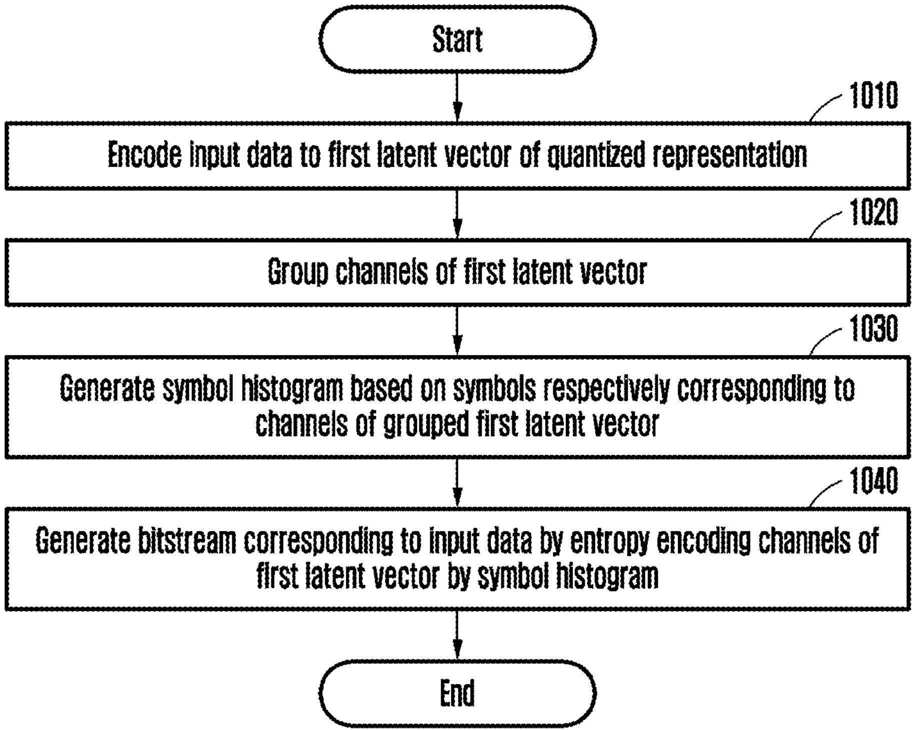
FIG. 10A is a flowchart of an encoding method of a neural codec according to one or more embodiments.
Figure 10B:
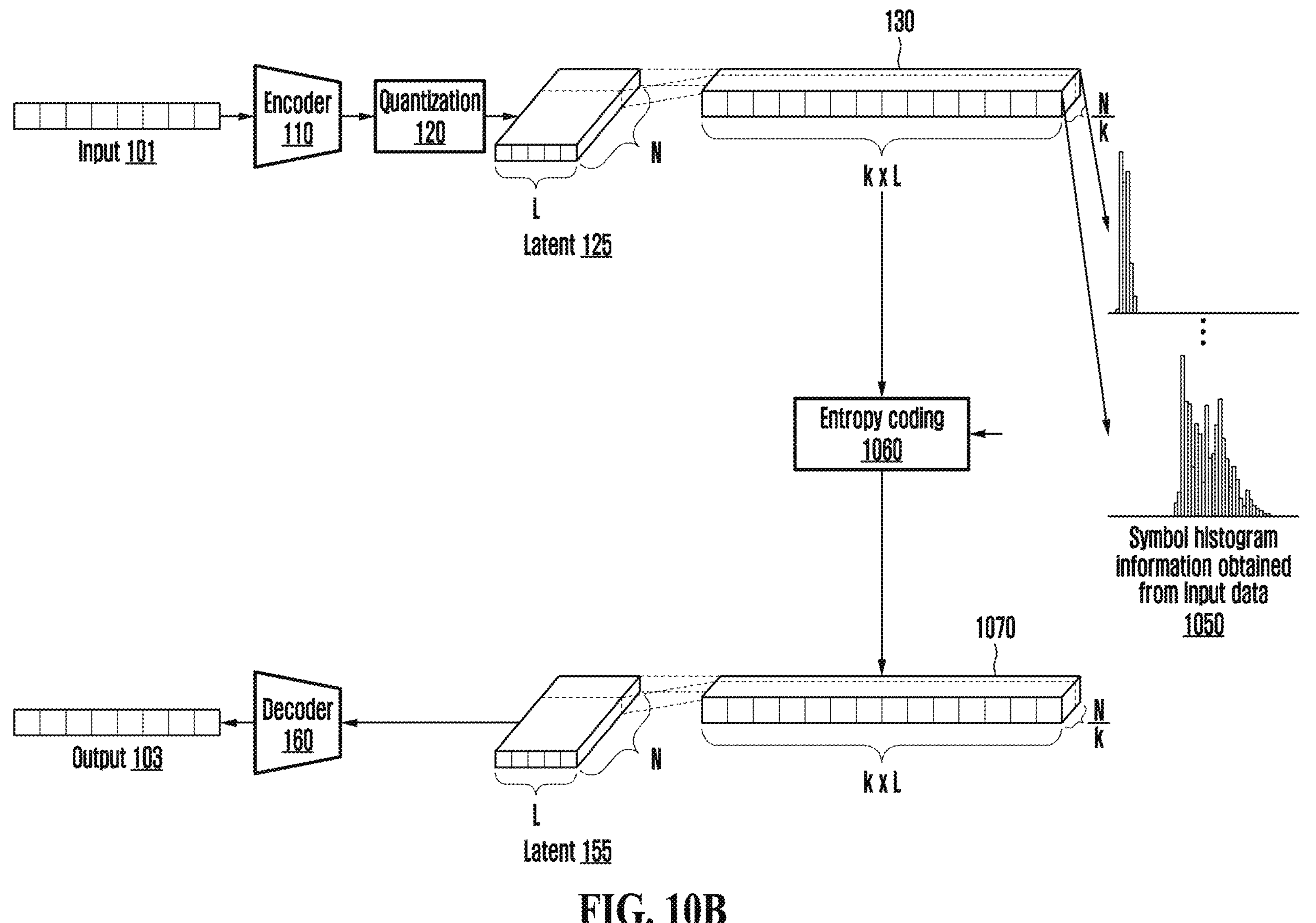
FIG. 10B is a diagram illustrating an encoding method of a neural codec according to one or more embodiments.

FIG. 10A is a flowchart of an encoding method of a neural codec according to one or more embodiments and FIG. 10B is a diagram illustrating an encoding method of a neural codec according to one or more embodiments.

Referring to FIGS. 10A and 10B, a neural encoder (e.g., the neural encoder 105 of FIG. 1) according to one or more embodiments may generate and transmit a bitstream from the input data 101 through operations 1010 to 1040.

In operation 1010, the neural encode may encode the input data 101 to the first latent vector 125 of a quantized representation. The neural encoder may generate a latent vector by encoding the input data 101 by the encoder 110 and may generate the first latent vector 125 by quantizing the latent vector by the quantizer 120. For example, a width W of the first latent vector 125 may be L and the number of channels of the first latent vector 125 may be N.

In operation 1020, the neural encoder may group 130 the channels of the first latent vector 125. The neural encoder may group 130 the channels by restricting a range of the first latent vector 125 to, for example, a 8 bit range (e.g., −128 to +128). The neural encoder may group 130 the first latent vector 125 of which the width W is L and the number of channels is N by stacking k first latent vectors 125 in a channel direction. The channels may be group according to an adjacent position or according to having a similar distribution.

In operation 1030, the neural encoder may generate a symbol histogram 1050 based on the symbols respectively corresponding to the channels of the grouped 130 first latent vector 125 in operation 1020. The neural encoder may generate the symbol histogram 1050 by counting the number of symbols from the channel-wise PMF information of the grouped 130 first latent vector 125. In this case, the number of symbols may correspond to the frequency information.

The neural encoder may generate the symbol histogram 1050 by counting the number of symbols in the channels of the grouped 130 first latent vector 125 and may perform entropy coding 1060 by the symbol histogram 1050. The neural encoder may perform entropy coding 1060 by directly using the symbol histogram 1050 during the inference. One example of the symbol histogram may be the symbol histogram 1050 of FIG. 10B below.

In operation 1040, the neural encoder may generate a bitstream 1070 corresponding to the input data 101 by performing entropy coding 1060 (more specifically, entropy encoding) on the channels of the first latent vector 125 by the symbol histogram 1050 generated in operation 1030.

In operation 1050, the neural encoder may transmit the bitstream 1070 generated in operation 1040.

As described above, the neural encoder may not use the trained PMF information, may obtain the symbol histogram 1050 of a channel to be grouped by passing the input data 101, and may perform the entropy coding 1060 by the symbol histogram 1050.

The neural decoder that receives the bitstream 1070 may generate the second latent vector 155 by entropy decoding. The decoder 160 may output the output data 103 corresponding to a restored image of the input data 101 by decoding the second latent vector 155.

Figure 11:
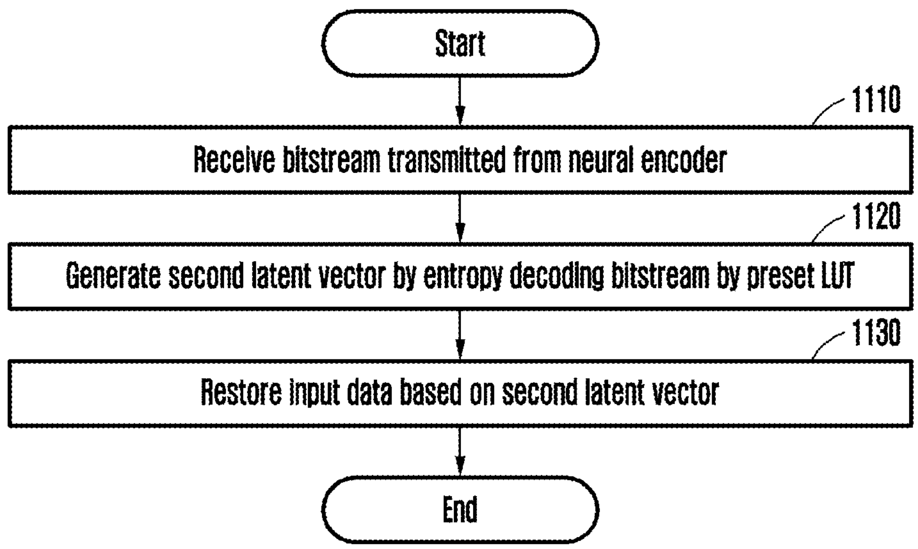
FIG. 11 is a flowchart of a decoding method of a neural codec according to one or more embodiments.

FIG. 11 is a flowchart of a decoding method of a neural codec according to one or more embodiments. Referring to FIG. 11, a neural decoder (e.g., the neural decoder 107 of FIG. 1) according to one or more embodiments may restore input data through operations 1110 to 1130.

In operation 1110, the neural decoder may receive a bitstream transmitted by a neural encoder.

In operation 1120, the neural decoder may generate a second latent vector by entropy decoding the bitstream received in operation 1110 by a preset LUT. The preset LUT may be generated based on channels of a first latent vector grouped by a distribution of symbols respectively corresponding to channels of the first latent vector of a quantized representation in which the input data is encoded by the neural encoder. In this case, the distribution of symbols may include, for example, at least one of a distribution of PMFs for frequencies of the symbols and a distribution of symbol histograms based on the symbols, but the example is not limited thereto.

In operation 1130, the neural decoder may restore the input data based on the second latent vector generated in operation 1120.

Figure 12:
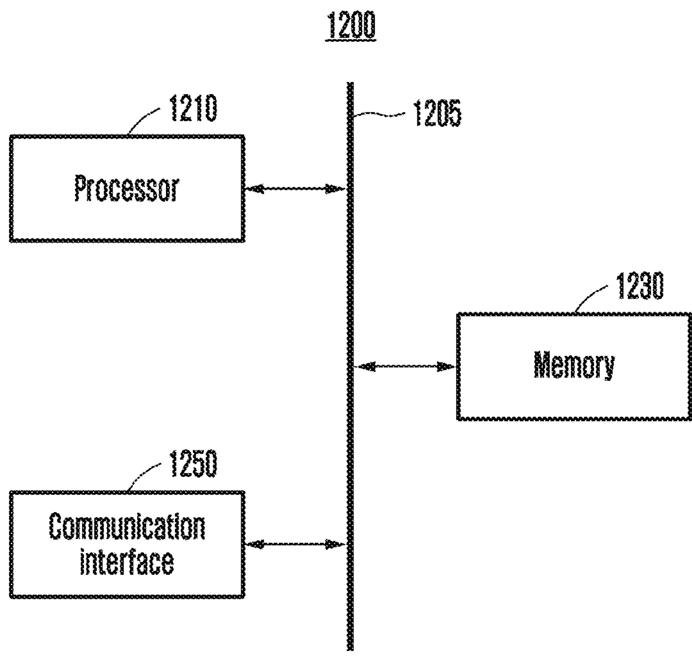
FIG. 12 is a block diagram of a neural encoder according to one or more embodiments.

FIG. 12 is a block diagram of a neural encoder according to one or more embodiments. Referring to FIG. 12, a neural encoder 1200 according to one or more embodiments may include a processor 1210, a memory 1230, and a communication interface 1250. The neural encoder 1200 may be, for example, the neural encoder 105 of FIG. 1, but is not limited thereto.

The processor 1210 may encode the input data to a first latent vector of a quantized representation. The processor 1210 may generate a bitstream corresponding to the input data by channel-wise grouping and entropy encoding the first latent vector.

In addition, the processor 1210 may perform the at least one method described above with reference to FIGS. 1 to 11 or an algorithm corresponding to the at least one method. The processor 1210 may be a hardware-implemented data processing device having a circuit that is physically structured to execute desired operations. For example, the desired operations may include code or instructions in a program. The processor 1210 may be implemented as, for example, a central processing unit (CPU), a graphics processing unit (GPU), or a neural network processing unit (NPU). The neural encoder 1200 may include, for example, a microprocessor, a CPU, a processor core, a multi-core processor, a multiprocessor, an application-specific integrated circuit (ASIC), and a field-programmable gate array (FPGA).

The processor 1210 may execute a program and may control the neural encoder 1200. Program codes to be executed by the processor 1210 may be stored in the memory 1230.

The memory 1230 may store instructions (or programs) executable by the processor 1210. For example, the instructions include instructions for performing an operation of the processor 1210 and/or an operation of each component of the processor 1210.

The memory 1230 may be implemented as a volatile or non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, or insulator resistance change memory.

The communication interface 1250 may transmit a bitstream generated by the processor 1210.

Figure 13:
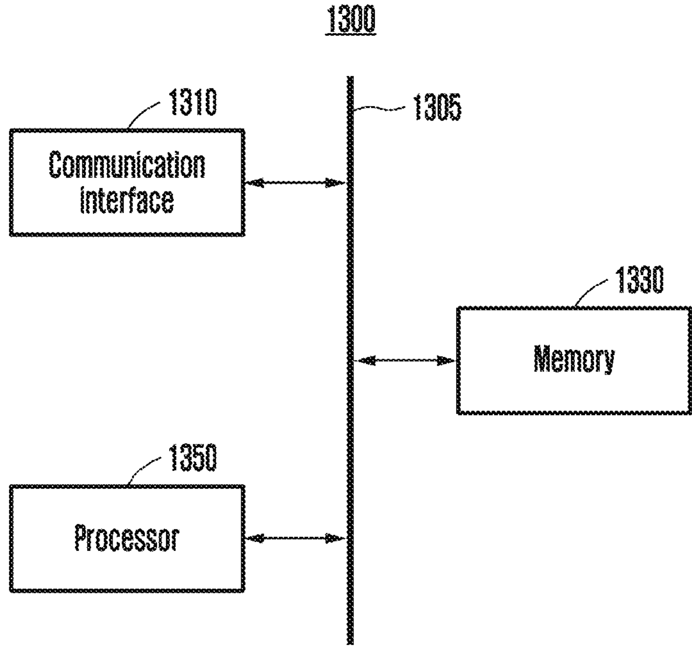
FIG. 13 is a block diagram of a neural decoder according to one or more embodiments.

FIG. 13 is a block diagram of a neural decoder according to one or more embodiments. Referring to FIG. 13, a neural decoder 1300 according to one or more embodiments may include a communication interface 1310, a memory 1330, and a processor 1350. The neural decoder 1300 may be, for example, the neural decoder 105 of FIG. 1, but is not limited thereto.

The communication interface 1310 may receive a bitstream corresponding to the input data.

The memory 1330 may store an LUT. The LUT may be generated based on channels of a first latent vector grouped by a distribution of symbols respectively corresponding to channels of the first latent vector of a quantized representation in which the input data is encoded.

The processor 1350 may generate a second latent vector by entropy decoding the bitstream by the LUT. The processor 1350 may restore the input data based on the second latent vector.

In addition, the processor 1350 may perform the at least one method described above with reference to FIGS. 1 to 11 or an algorithm corresponding to the at least one method. The processor 1350 may be a hardware-implemented data processing device having a circuit that is physically structured to execute desired operations. For example, the desired operations may include code or instructions in a program. The processor 1350 may be implemented as, for example, a CPU, a GPU, or an NPU. For example, the neural decoder 1300 may include a microprocessor, a CPU, a processor core, a multi-core processor, a multiprocessor, an ASIC, and an FPGA.

The processor 1350 may execute a program and may control the neural decoder 1300. Program codes to be executed by the processor 1350 may be stored in the memory 1330.

The embodiments described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be stored permanently or temporarily in any type of machine, component, physical or virtual equipment, computer storage medium, or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An encoding method of a neural codec performed by at least one processor, the method comprising:

encoding input data to a first latent vector of a quantized representation;

generating, after encoding the input data, a bitstream corresponding to the input data by channel-wise grouping and entropy encoding the first latent vector; and transmitting the bitstream, wherein the generating the bitstream further comprises:

grouping channels of the first latent vector;

predicting a distribution of probability mass functions (PMFs) of frequencies of symbols respectively corresponding to the grouped channels of the first latent vector by an entropy layer of the neural codec; and generating the bitstream by entropy encoding the channels of the first latent vector based on the distribution of PMFs.

2. The method of claim 1, wherein the grouping of the channels of the first latent vector further comprises:

sequentially grouping the channels of the first latent vector according to an adjacent position.

3. The method of claim 1, wherein the neural codec comprises the entropy layer, and the predicting of the distribution of PMFs further comprises estimating the distribution of PMFs respectively corresponding to the grouped channels of the first latent vector in the entropy layer.

4. The method of claim 1, wherein the generating of the bitstream by entropy encoding the channels of the first latent vector further comprises:

performing the entropy encoding by grouping channels having a predetermined similarity of the distribution of the PMFs among the grouped channels of the first latent vector.

5. The method of claim 1, wherein the bitstream is generated by entropy encoding the grouped channels of the first latent vector using a look-up table (LUT) generated based on the distribution of PMFs.

6. The method of claim 5, wherein the LUT is generated by assigning, using Huffman coding, bits corresponding to the frequencies of the symbols to nodes of a binary tree and generating bit information corresponding to the nodes in which the symbols are positioned in the binary tree.

7. The method of claim 1, wherein the generating of the bitstream by entropy encoding the channels of the first latent vector further comprises:

generating the bitstream by differently adjusting a length of code generated according to the frequencies of the symbols by the entropy encoding.

8. The method of claim 1, wherein the encoding to the first latent vector further comprises:

generating an initial latent vector by encoding the input data; and generating the first latent vector by quantizing the initial latent vector.

9. The method of claim 8, wherein the generating of the first latent vector comprises:

clamping the initial latent vector in a predetermined range; and generating the first latent vector by quantizing the clamped initial latent vector.

10. The method of claim 1, wherein the neural codec is trained by a first loss between the input data and restored input data and a second loss based on a latency of the first latent vector.

11. The method of claim 10, wherein the neural codec is trained by adjusting at least one of a first weight corresponding to the first loss and a second weight corresponding to the second loss.

12. A decoding method of a neural codec performed by at least one processor, the method comprising:

receiving a bitstream transmitted by a neural encoder;

generating a second latent vector by entropy decoding the bitstream using a preset look-up table (LUT); and restoring the input data based on the second latent vector, wherein the preset LUT is generated based on channels of a first latent vector grouped by a distribution of symbols respectively corresponding to channels of the first latent vector of a quantized representation in which the input data is encoded by the neural encoder, wherein the bitstream is generated by entropy encoding grouped channels of the first latent vector using an LUT generated based on a distribution of probability mass functions (PMFs) for frequencies of the symbols.

13. The method of claim 12, wherein the distribution of symbols further comprises a distribution of symbol histograms based on the symbols.

14. The method of claim 12, wherein the LUT is generated by assigning, using Huffman coding, bits corresponding to the frequencies of the symbols to nodes of a binary tree and generating bit information corresponding to the nodes in which the symbols are positioned in the binary tree.

15. A learning method of a neural codec comprising a neural encoder and a neural decoder, the method comprising:

encoding input data to a first latent vector of a quantized representation by the neural encoder;

generating, after encoding the input data, a bitstream corresponding to the input data by channel-wise grouping and entropy encoding the first latent vector;

obtaining a second latent vector by entropy decoding the bitstream;

restoring the second latent vector to the input data by the neural decoder; and learning the neural codec based on a difference between the input data and the restored input data, wherein the generating of the bitstream comprises:

channel-wise grouping channels of the first latent vector;

predicting a distribution of probability mass functions (PMFs) indicating frequencies of symbols respectively corresponding to the grouped channels of the first latent vector by an entropy layer of the neural codec; and generating the bitstream by entropy encoding the channels of the first latent vector based on the distribution of PMFs.

16. The method of claim 15, wherein the generating of the bitstream by entropy encoding the channels of the first latent vector comprises:

generating a look-up table (LUT) based on the distribution of PMFs; and generating the bitstream by entropy encoding the grouped channels of the first latent vector using the LUT.

17. The method of claim 16, wherein the generating of the LUT comprises:

assigning, by using Huffman coding, bits matching the frequencies of the symbols to nodes of a binary tree; and generating the LUT by bit information corresponding to the nodes in which the symbols are positioned in the binary tree.

* * * * *